(12) United States Patent
Matsumura et al.

(10) Patent No.: US 10,183,657 B2
(45) Date of Patent: Jan. 22, 2019

(54) MASTER CYLINDER

(71) Applicant: HITACHI AUTOMOTIVE SYSTEMS, LTD., Hitachinaka-shi, Ibaraki (JP)

(72) Inventors: Sadatomo Matsumura, Yokohama (JP); Yoichi Kumemura, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 157 days.

(21) Appl. No.: 14/763,883

(22) PCT Filed: Jan. 29, 2014

(86) PCT No.: PCT/JP2014/051932
§ 371 (c)(1),
(2) Date: Jul. 28, 2015

(87) PCT Pub. No.: WO2014/119611
PCT Pub. Date: Aug. 7, 2014

(65) Prior Publication Data
US 2015/0360660 A1    Dec. 17, 2015

(30) Foreign Application Priority Data
Jan. 31, 2013    (JP) .............................. 2013-016622

(51) Int. Cl.
*B60T 11/236*    (2006.01)
*B60T 11/232*    (2006.01)
(Continued)

(52) U.S. Cl.
CPC ............. *B60T 11/236* (2013.01); *B60T 11/20* (2013.01); *B60T 11/232* (2013.01); *F16J 1/001* (2013.01);
(Continued)

(58) Field of Classification Search
CPC ............................ B60T 11/236; B60T 11/228
(Continued)

(56) References Cited

U.S. PATENT DOCUMENTS

| | | | | | |
|---|---|---|---|---|---|
| 2,660,493 | A | * | 11/1953 | Flick | F16J 15/3236 277/436 |
| 3,601,419 | A | * | 8/1971 | Fern | F16J 15/3236 277/436 |

(Continued)

FOREIGN PATENT DOCUMENTS

| | | | | |
|---|---|---|---|---|
| DE | 102012014321 A1 | * | 1/2014 | ............ B60T 11/236 |
| JP | 63-53862 | | 4/1988 | |

(Continued)

OTHER PUBLICATIONS

International Search Report for PCT/JP2014/051932 dated May 13, 2014, four pages.
(Continued)

*Primary Examiner* — F. Daniel Lopez
*Assistant Examiner* — Matthew Wiblin
(74) *Attorney, Agent, or Firm* — Mattingly & Malur, PC

(57) ABSTRACT

A master cylinder includes a piston seal installed in a circumferential groove. The piston seal includes an annular base section, an inner circumferential lip section protruding from an inner circumferential side of the base section to come in sliding contact with an outer circumferential surface of a piston, an outer circumferential lip section protruding from an outer circumferential side of the base section to abut the circumferential groove, and an intermediate protrusion section protruding from between the inner circumferential lip section and the outer circumferential lip section of the base section to a forward side of the outer circumferential lip section. A step difference section is formed at the outer circumferential side. The circumferential groove has a step section that always abuts an outer circumferential surface of the step difference section. A communication path configured to bring a supply path that is in communication with a reservoir and the bottom section side of the circumferential groove in communication with each other is formed between the step difference section and the step section.

15 Claims, 13 Drawing Sheets

(51) Int. Cl.
  *B60T 11/20*  (2006.01)
  *F16J 15/18*  (2006.01)
  *F16J 15/32*  (2016.01)
  *F16J 1/00*  (2006.01)
  *F16J 15/16*  (2006.01)

(52) U.S. Cl.
  CPC ............... *F16J 15/16* (2013.01); *F16J 15/18* (2013.01); *F16J 15/32* (2013.01)

(58) Field of Classification Search
  USPC .......... 60/585, 588; 277/436, 438, 439, 556, 277/567
  See application file for complete search history.

(56) References Cited

U.S. PATENT DOCUMENTS

| | | | | |
|---|---|---|---|---|
| 4,601,235 A * | 7/1986 | Roberts | ................ | F04B 53/143 277/437 |
| 4,781,024 A * | 11/1988 | Nakamura | ........... | F16J 15/3236 277/558 |
| 6,722,658 B2 * | 4/2004 | Siegrist | ................ | F16J 15/3236 277/436 |
| 8,297,626 B2 * | 10/2012 | Schaefer | ................ | F16J 15/025 102/469 |
| 8,567,788 B2 * | 10/2013 | Bernadat | ................ | B60T 11/236 277/436 |
| 2010/0045100 A1 * | 2/2010 | Lee | .......... | F16J 15/56 303/117.1 |
| 2010/0154407 A1 * | 6/2010 | Bernadat | ................ | B60T 11/236 60/533 |
| 2011/0185890 A1 * | 8/2011 | Kang | ................... | F16J 15/3236 92/165 R |

FOREIGN PATENT DOCUMENTS

| | | |
|---|---|---|
| JP | 2004-314743 | 11/2004 |
| JP | 2012-71753 | 4/2012 |

OTHER PUBLICATIONS

Written Opinion of the ISA for PCT/JP2014/051932 dated May 13, 2014, three pages.

* cited by examiner

MASTER CYLINDER

TECHNICAL FIELD

The present invention relates to a master cylinder configured to supply a fluid pressure to a brake cylinder of a vehicle.

This application is the U.S. national phase of International Application No. PCT/JP 2014/051932 filed Jan. 29, 2014 which designated the U.S. and claims priority based on Japan Patent Application No. 2013-016622, filed Jan. 31, 2013, the contents of each of which are incorporated herein by reference.

BACKGROUND ART

In a master cylinder, a spacer ring is installed at a rear surface of a cup seal through adhesion or concavo-convex fitting (for example, see Patent Literature 1).

CITATION LIST

Patent Literature

[Patent Literature 1] Japanese Unexamined Patent Application, First Publication No. 2004-314743

SUMMARY OF INVENTION

Technical Problem

In a master cylinder, a piston seal seals a flow of a brake fluid from the inside toward a reservoir. Meanwhile, in the piston seal, supply of the brake fluid from the reservoir side to the inside is performed when a flow of the brake fluid from the reservoir side to the inside is allowed. In this case, when a posture of the piston seal is unstable, smooth supply may be inhibited.

The present invention provides a master cylinder capable of stabilizing a posture of a piston seal.

Solution to Problem

According to a first aspect of the present invention, a master cylinder includes a cylinder main body having a bottomed cylindrical shape including an ejection path of a brake fluid and a supply path in communication with a reservoir; a piston movably disposed in the cylinder main body and configured to form a pressure chamber formed to supply a fluid pressure to the ejection path between the piston and the cylinder main body; and a piston seal installed in a circumferential groove formed in the cylinder main body such that an inner circumference thereof comes in sliding contact with the piston to seal between the supply path and the pressure chamber. The piston seal includes an annular base section, an inner circumferential lip section projecting from the base portion and being in slidable contact with an outer circumferential surface of the piston and an outer circumferential lip section abutting the circumferential groove of the cylinder main body. A step difference section that is long in the axial direction at an inner circumferential side is formed at an outer circumferential side of the base section. The circumferential groove has a step section at a circumferential wall of an opening section side of the cylinder main body, the step section always abuts an outer circumferential surface of the step difference section.

According to a second aspect of the present invention, a communication path configured to bring the supply path in communication with a bottom section side of the circumferential groove may be formed between the step difference section and the step section.

According to a third aspect of the present invention, the piston seal may further include an intermediate protrusion section projecting from between the inner circumferential lip section and the outer circumferential lip section of the base section to a forward side of the outer circumferential lip section. Another step section in which an outer circumferential surface of the intermediate protrusion section abuts may be formed at a circumferential wall of the circumferential groove on a side closer to the bottom section side of the cylinder main body. A plurality of communication sections configured to bring the bottom section side of the circumferential groove in communication with the pressure chamber may be formed at a front end side of the intermediate protrusion section to be spaced apart from each other in the circumferential direction.

According to a fourth aspect of the present invention, the inner circumferential lip section may be bent in a direction approaching the intermediate protrusion section in response to the pressure state between the pressure chamber and the supply path to bring the supply path and the pressure chamber in communication with each other.

According to a fifth aspect of the present invention, the piston seal may be configured such that the inner circumferential surface of the base section becomes spaced apart from the outer circumferential surface of the piston at a time of a basic state serving as a non-braking state before a brake pedal configured to move the piston is manipulated.

According to a sixth aspect of the present invention, a cutout section that is longer in the axial direction of the step difference section at the outer circumferential side than at the inner circumferential side may be formed at an inner circumferential side of the base section.

Advantageous Effects of Invention

According to the above-mentioned master cylinder, the posture of the piston seal can be stabilized.

[DESCRIPTION OF EMBODIMENTS]

[First Embodiment]

Figure 1:
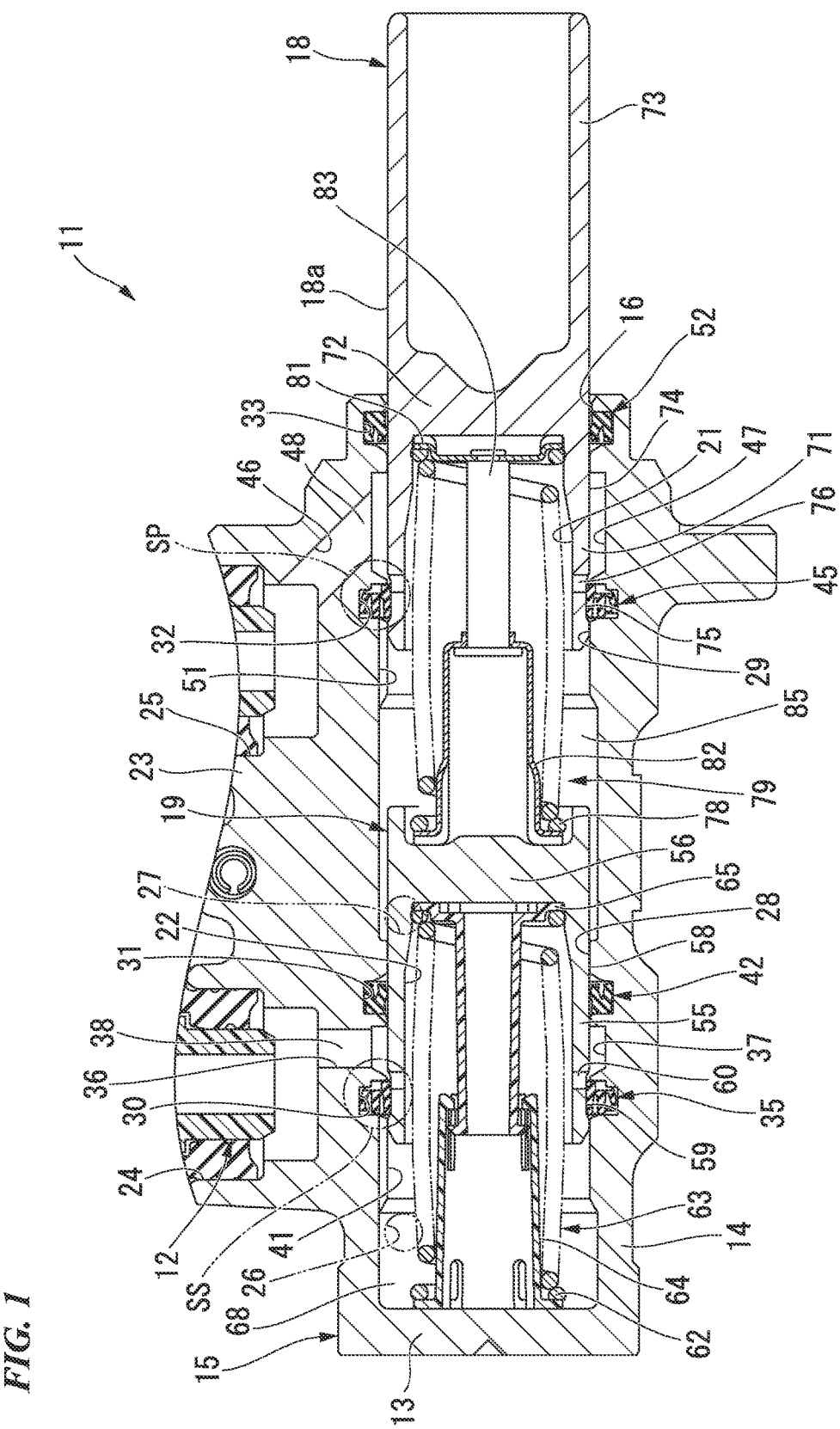
FIG. 1 is a cross-sectional view showing a master cylinder of a first embodiment according to the present invention.

A first embodiment according to the present invention will be described based on FIGS. 1 to 6B. A force according to a manipulation amount of a brake pedal (not shown) is introduced into a master cylinder 11 of a first embodiment shown in FIG. 1 via an output shaft of a brake booster (not shown). The master cylinder 11 generates a brake fluid pressure according to the manipulation amount of the brake pedal. A reservoir 12 (only a portion thereof is shown in FIG. 1) configured to supply and drain a brake fluid upward in a vertical direction is attached to the master cylinder 11. Further, in the embodiment, while the reservoir 12 is directly attached to the master cylinder 11, the reservoir may be disposed at a position spaced apart from the master cylinder 11, and the reservoir and the master cylinder 11 may be connected to each other through a pipe.

The master cylinder 11 has a cylinder main body 15 formed of a metal. The cylinder main body 15 is formed by machining one material in a bottomed cylindrical shape having a bottom section 13 and a cylindrical section 14. The cylinder main body 15 is disposed in a vehicle in a posture in which an axial direction corresponds to forward and rearward directions of the vehicle. A primary piston (a piston) 18 formed of a metal is movably disposed at an opening section 16 side of the cylinder main body 15. A secondary piston (a piston) 19 formed of a metal is movably disposed closer to the bottom section 13 than the primary piston 18 of the cylinder main body 15. An inner circumferential hole 21 having a bottom surface is formed in the primary piston 18. An inner circumferential hole 22 having a bottom surface is formed in the secondary piston 19. The master cylinder 11 is a so-called plunger type. In addition, the master cylinder 11 is a tandem type master cylinder having the two pistons 18 and 19. Further, application of the embodiment is not limited to the tandem type master cylinder but may also be applied to a single type master cylinder in which one piston is disposed in a cylinder main body, any plunger type master cylinder such as a master cylinder having three or more pistons, or the like, as long as the embodiment is the plunger type master cylinder.

An attachment section 23 protruding toward the outside in a radial direction of the cylindrical section 14 (hereinafter referred to as a cylinder radial direction) is integrally formed with the cylinder main body 15 at a predetermined position in a circumferential direction of the cylindrical section 14 (hereinafter referred to as a cylinder circumferential direction). Attachment holes 24 and 25 configured to attach the reservoir 12 are formed in the attachment section 23. Further, in the embodiment, the attachment holes 24 and 25 are formed above in the vertical direction at positions deviated in a direction of an axis of the cylindrical section 14 of the cylinder main body 15 (hereinafter referred to as a cylinder axis) in a state in which the positions in the cylinder circumferential direction coincide with each other.

A secondary ejection path (an ejection path) 26 is formed closer to the bottom section 13 at the attachment section 23 side of the cylindrical section 14 of the cylinder main body 15. In addition, a primary ejection path (an ejection path) 27 is formed closer to the opening section 16 of the cylinder main body 15 than the secondary ejection path 26. The secondary ejection path 26 and the primary ejection path 27 come in communication with a brake cylinder such as a disk brake, a drum brake, or the like, via a brake pipe, which is not shown, and eject a brake fluid toward the brake cylinder. Further, in the embodiment, the secondary ejection path 26 and the primary ejection path 27 are formed at positions deviated in the cylinder axial direction in a state in which the positions in the cylinder circumferential direction coincide with each other.

The secondary piston 19 is slidably guided to a sliding inner diameter section 28 formed at an inner circumferential section of the bottom section 13 side of the cylindrical section 14 of the cylinder main body 15. The primary piston 18 is slidably guided to a sliding inner diameter section 29 formed at an inner circumferential section of the opening section 16 side of the cylindrical section 14 of the cylinder main body 15.

Either a plurality of circumferential grooves 30 and a plurality of circumferential grooves 31 that form an annular shape while positions in the cylinder axial direction are deviated are formed in the sliding inner diameter section 28 in sequence from the bottom section 13 side. In the embodiment, specifically, the circumferential groove 30 and the circumferential groove 31 are formed at two places. In addition, either a plurality of circumferential grooves 32 and a plurality of circumferential grooves 33 that form an annular shape while positions in the cylinder axial direction are deviated are also formed in the sliding inner diameter section 29 in sequence from the bottom section 13 side. In the embodiment, specifically, the circumferential groove 32 and the circumferential groove 33 are formed at two places. These circumferential grooves 30 to 33 form an annular shape in the cylinder circumferential direction to provide a concave shape outside in the cylinder radial direction. All the circumferential grooves 30 to 33 are formed by cutting.

The circumferential groove 30 disposed closest to the bottom section 13 is formed in the vicinity of the attachment hole 24 of the bottom section 13 side of the attachment holes 24 and 25. An annular piston seal 35 is disposed in the circumferential groove 30 to be held in the circumferential groove 30.

An annular opening groove 37 concaved outward in the cylinder radial direction is formed such that a communication hole 36 punched from the attachment hole 24 of the bottom section 13 side is opened in the cylindrical section 14 closer to the opening section 16 than the circumferential groove 30 in the sliding inner diameter section 28 of the cylinder main body 15. Here, the opening groove 37 and the communication hole 36 constitute a secondary supply path (a supply path) 38 in constant communication with the reservoir 12 installed at the cylinder main body 15.

A communication groove 41 is formed at the bottom section 13 side of the circumferential groove 30 of the sliding inner diameter section 28 of the cylinder main body 15. The communication groove 41 extends from the circumferential groove 30 toward the bottom section 13 in a linear shape in the cylinder axial direction while being opened at the circumferential groove 30, and is formed to be concaved outward in the cylinder radial direction. The communication groove 41 brings the secondary ejection path 26 formed at a position in the vicinity of the bottom section 13 disposed between the bottom section 13 and the circumferential groove 30 in communication with the circumferential groove 30 via a secondary pressure chamber 68 (to be described below).

The circumferential groove 31 is formed at an opposite side of the circumferential groove 30 of the opening groove 37 in the cylinder axial direction in the sliding inner diameter section 28 of the cylinder main body 15, i.e., at the opening section 16 side of the cylinder main body 15. An annular division seal 42 held in the circumferential groove 31 is disposed in the circumferential groove 31.

The circumferential groove 32 is formed in the vicinity of the attachment hole 25 of the opening section 16 side in the sliding inner diameter section 29 of the cylinder main body 15. An annular piston seal 45 held in the circumferential groove 32 is disposed in the circumferential groove 32.

An opening groove 47 is formed at the opening section 16 side of the circumferential groove 32 in the sliding inner diameter section 29 of the cylinder main body 15. The opening groove 47 opens a communication hole 46 punched from the attachment hole 25 of the opening section 16 side in the cylindrical section 14, and is annularly formed to be concaved outward in the cylinder radial direction. Here, the opening groove 47 and the communication hole 46 mainly constitute a primary supply path (a supply path) 48 formed at the cylinder main body 15 and in constant communication with the reservoir 12.

A communication groove 51 is formed at the bottom section 13 side of the circumferential groove 32 of the sliding inner diameter section 29 of the cylinder main body 15. The communication groove 51 is formed to extend from the circumferential groove 32 toward the bottom section 13 in a linear shape in the cylinder axial direction while being opened at the circumferential groove 32, and to be concaved outward in the cylinder radial direction. The communication groove 51 comes in communication with the primary ejection path 27 and the circumferential groove 32 formed at a position in the vicinity of the circumferential groove 31 via a primary pressure chamber 85 (to be described below).

The circumferential groove 33 is formed at an opposite side of the circumferential groove 32 of the opening groove 47 in the sliding inner diameter section 29 of the cylinder main body 15, i.e., at the opening section 16 side of the cylinder main body 15. An annular division seal 52 is disposed in the circumferential groove 33 to be held in the circumferential groove 33.

The secondary piston 19 fitted to the bottom section 13 side of the cylinder main body 15 forms a bottomed cylindrical shape having a tubular section 55 and a bottom section 56 formed at one side in the axial direction of the tubular section 55. The inner circumferential hole 22 is formed by the tubular section 55 and the bottom section 56. The secondary piston 19 is slidably fitted to the inner circumferences of the piston seal 35 and the division seal 42 installed at the sliding inner diameter section 28 of the cylinder main body 15 in a state in which the tubular section 55 is disposed at the bottom section 13 side of the cylinder main body 15.

An annular step section 59 is formed at an outer circumferential section of an opposite end side of the bottom section 56 of the tubular section 55. The step section 59 is formed in a step difference shape to be disposed further inside in the radial direction than an outer diameter surface 58 having a largest diameter in the secondary piston 19. A plurality of ports 60 passing in the cylinder radial direction at the bottom section 56 side are radially formed at the step section 59 at equal intervals in the cylinder circumferential direction. Further, the step section 59 may not be formed, but the outer circumferential surface of the secondary piston 19 may be formed to have a constant outer diameter. The plurality of ports 60 may not be formed, but one or more ports 60 may be formed. In addition, when the plurality of ports 60 are formed, the ports 60 may not be formed at equal intervals in the cylinder circumferential direction.

An interval adjustment section 63 is installed between the secondary piston 19 and the bottom section 13 of the cylinder main body 15. The interval adjustment section 63 is configured to include a secondary piston spring 62 that determines an interval between the secondary piston 19 and the bottom section 13 of the cylinder main body 15 in a non-braking state in which there is no input from the brake pedal (not shown) side (a right side of FIG. 1). The interval adjustment section 63 has a locking member 64 that abuts the bottom section 13 of the cylinder main body 15, and a locking member 65 that is connected to the locking member 64 to be slidable within a predetermined range and abuts the bottom section 56 of the secondary piston 19. The secondary piston spring 62 is interposed between the locking members 64 and 65 of both sides.

Here, a portion surrounded by the bottom section 13 of the cylinder main body 15, the bottom section 13 side of the cylindrical section 14 and the secondary piston 19 is the secondary pressure chamber (the pressure chamber) 68 configured to generate a brake fluid pressure and supply the brake fluid pressure to the secondary ejection path 26. In other words, the secondary piston 19 forms the secondary pressure chamber 68 between the secondary piston 19 and the cylinder main body 15 to supply a fluid pressure to the secondary ejection path 26. The secondary pressure chamber 68 is configured to come in communication with the secondary supply path 38, i.e., the reservoir 12, when the secondary piston 19 is disposed at a position at which the port 60 is opened to the opening groove 37.

The division seal 42 held in the circumferential groove 31 of the cylinder main body 15 is an integrally molded product formed of a synthetic rubber. In the division seal 42, one side shape of a cross section in the radial direction including a centerline has a C shape. The division seal 42 always seals a gap between the secondary piston 19 and the cylinder main body 15 at a position of the division seal 42 as the inner circumference comes in sliding contact with the outer circumference of the secondary piston 19 that moves in the cylinder axial direction and the outer circumference abuts the circumferential groove 31 of the cylinder main body 15.

The piston seal 35 held in the circumferential groove 30 of the cylinder main body 15 is an integrally molded product formed of a synthetic rubber such as EPDM or the like. An inner circumference of the piston seal 35 comes in sliding contact with the outer circumference of the secondary piston 19 that moves in the cylinder axial direction. The piston seal 35 is configured such that the outer circumference abuts the circumferential groove 30 of the cylinder main body 15. The piston seal 35 is configured to seal between the secondary supply path 38 and the secondary pressure chamber 68 in a state in which the secondary piston 19 disposes the port 60 closer to the bottom section 13 than the piston seal 35. That is, the piston seal 35 is able to block communication between the secondary pressure chamber 68, the secondary supply path 38 and the reservoir 12. In the sealed state, as the secondary piston 19 slides along the sliding inner diameter section 28 of the cylinder main body 15 and the inner circumferences of the piston seal 35 and the division seal 42 held by the cylinder main body 15 to move toward the bottom section 13, the brake fluid in the secondary pressure chamber 68 is pressurized. The brake fluid pressurized in the secondary pressure chamber 68 is supplied from the secondary ejection path 26 into the brake cylinder of the wheel side.

When the above-mentioned secondary piston 19 is disposed at a basic position (a non-braking position) at which the port 60 is opened to the opening groove 37 as shown in FIG. 1 with no input from the brake pedal (not shown) side, the piston seal 35 partially overlaps the port 60 in the step section 59 of the secondary piston 19. Then, when the secondary piston 19 moves toward the bottom section 13 of the cylinder main body 15 and the inner circumferential section of the piston seal 35 entirely overlaps the port 60, communication between the secondary pressure chamber 68 and the reservoir 12 is blocked.

The primary piston 18 fitted to the opening section 16 side of the cylinder main body 15 has a first tubular section 71, a bottom section 72 formed at one side in the axial direction of the first tubular section 71, and a second tubular section 73 formed at the bottom section 72 on an opposite from the first tubular section 71. The inner circumferential hole 21 is formed by the first tubular section 71 and the bottom section 72. The primary piston 18 is slidably fitted to the inner circumferences of the piston seal 45 and the division seal 52 installed at the sliding inner diameter section 29 of the cylinder main body 15 in a state in which the first tubular section 71 is disposed at the secondary piston 19 side in the cylinder main body 15. Here, an output shaft of the brake booster is disposed inside the second tubular section 73. The primary piston 18 moves the cylinder main body 15 as the bottom section 72 is pressed by movement of the output shaft.

An annular step section 75 is formed at an outer circumferential section of an end side of the first tubular section 71 opposite to the bottom section 72. The step section 75 is formed such that a step difference shape is disposed further inside in the radial direction than an outer diameter surface 74 having a largest diameter in the primary piston 18. A plurality of ports 76 passing in the radial direction at the bottom section 72 are radially formed at the step section 75 at equal intervals in the cylinder circumferential direction. Further, the step section 75 may not be formed but the outer circumferential surface of the primary piston 18 may be formed to have a constant outer diameter. The plurality of ports 76 may not be formed but one or more ports 76 may be formed. In addition, when the plurality of ports 76 are formed, the ports 76 may not be formed at equal intervals in the cylinder circumferential direction.

An interval adjustment section 79 is installed between the secondary piston 19 and the primary piston 18. The interval adjustment section 79 is configured to include a primary piston spring 78 configured to determine these intervals in a non-braking state in which there is no input from the brake pedal (not shown) side (the right side of FIG. 1). The interval adjustment section 79 has a locking member 81 that abuts the bottom section 72 of the primary piston 18, a locking member 82 that abuts the bottom section 56 of the secondary piston 19, and a shaft member 83 that slidably supports the locking member 82 within a predetermined range while one end section is fixed to the locking member 81. The primary piston spring 78 is interposed between the locking members 81 and 82 of both sides.

Here, a portion surrounded by the cylindrical section 14 of the cylinder main body 15, the primary piston 18 and the secondary piston 19 is the primary pressure chamber (the pressure chamber) 85 configured to generate a brake fluid pressure and supply a brake fluid into the primary ejection path 27. In other words, the primary piston 18 forms the primary pressure chamber 85 disposed between the secondary piston 19 and the cylinder main body 15 and configured to supply a fluid pressure into the primary ejection path 27. The primary pressure chamber 85 comes in communication with the primary supply path 48, i.e., the reservoir 12, when the primary piston 18 is disposed at a position at which the port 76 is opened to the opening groove 47.

The division seal 52 held in the circumferential groove 33 of the cylinder main body 15 is the same part as the division seal 42, and is an integrally molded product formed of a synthetic rubber. In the division seal 52, one side shape of a cross section in the radial direction including the centerline is a C shape. The division seal 52 always seals a gap between the primary piston 18 and the cylinder main body 15 at a position where the division seal 52 is disposed as the inner circumference comes in sliding contact with the outer circumference of the primary piston 18 that moves in the cylinder axial direction and the outer circumference abuts the circumferential groove 33 of the cylinder main body 15.

The piston seal 45 held in the circumferential groove 32 of the cylinder main body 15 is the same part as the piston seal 35, and is an integrally molded product formed of a synthetic rubber such as EPDM or the like. The inner circumference of the piston seal 45 comes in sliding contact with the outer circumference of the primary piston 18 that moves in the cylinder axial direction. The piston seal 45 is configured such that the outer circumference abuts the circumferential groove 32 of the cylinder main body 15. The piston seal 45 is configured to seal between the primary supply path 48 and the primary pressure chamber 85 in a state in which the primary piston 18 disposes the port 76 closer to the bottom section 13 than the piston seal 45. That is, the piston seal 45 is able to block communication between the primary pressure chamber 85, the primary supply path 48 and the reservoir 12. In the sealed state, as the primary piston 18 slidably moves along the sliding inner diameter section 29 of the cylinder main body 15 and the inner circumferences of the piston seal 45 and the division seal 52 held by the cylinder main body 15 to move toward the bottom section 13, the brake fluid in the primary pressure chamber 85 is pressurized. The brake fluid pressurized in the primary pressure chamber 85 is supplied from the primary ejection path 27 into the brake cylinder of the wheel side.

When the primary piston 18 is disposed at a basic position (a non-braking position) at which the port 76 is opened to the opening groove 47 as shown in FIG. 1 with no input from the brake pedal (not shown) side, the piston seal 45 partially overlaps the port 76 in the step section 75 of the primary piston 18. Then, when the primary piston 18 moves toward the bottom section 13 of the cylinder main body 15 and the inner circumferential section of the piston seal 45 entirely overlaps the port 76, communication between the primary pressure chamber 85 and the reservoir 12 is blocked.

Here, a structure section constituted by the circumferential groove 30 of the cylinder main body 15 and the periphery thereof, the piston seal 35, and the sliding contact portion of the piston seal 35 of the secondary piston 19 is referred to as a seal structure section SS of a secondary side. In addition, a structure section constituted by the circumferential groove 32 of the cylinder main body 15 and the periphery thereof, the piston seal 45, and the sliding contact portion of the piston seal 45 of the primary piston 18 is referred to as a seal structure section SP of a primary side. The seal structure section SS of the secondary side and the seal structure section SP of the primary side have the same structure. Accordingly, in the following description, the seal structure section SP of the primary side will be described in detail with reference to FIGS. 2 to 6B.

Figure 2:
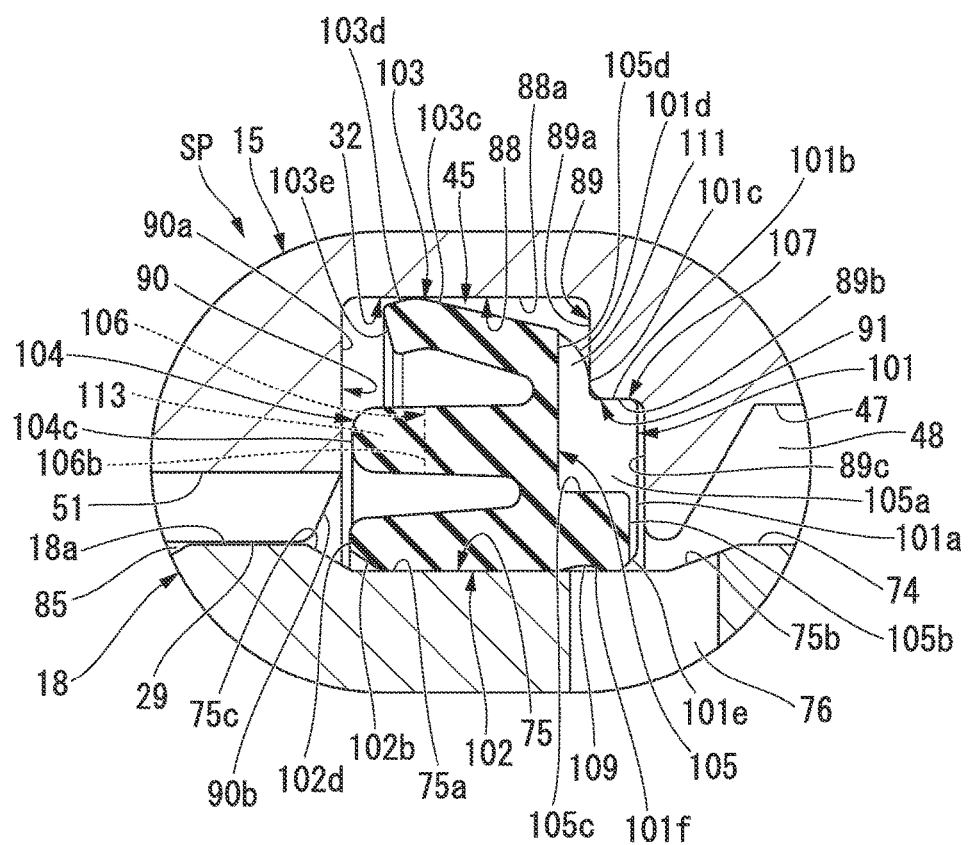
FIG. 2 is a partially enlarged cross-sectional view of a major part of the master cylinder of the first embodiment, showing a state in which a piston is at a basic position.

As shown in FIG. 2, the circumferential groove 32 has a groove bottom section 88 (a bottom section of the circumferential groove 32) disposed at the outermost side (an upper side of FIG. 2) in the cylinder radial direction. The circumferential groove 32 has a circumferential wall 89 extending from an edge section of the opening section 16 side (a right side of FIG. 2, hereinafter referred to as a cylinder opening side) of the cylinder main body 15 in the groove bottom section 88 inward in the cylinder radial direction. The circumferential groove 32 has a circumferential wall 90 extending from an edge section of the bottom section 13 side (a left side of FIG. 2, hereinafter referred to as a cylinder bottom side) of the cylinder main body 15 in the groove bottom section 88 inward in the cylinder radial direction. The groove bottom section 88, the circumferential wall 89 and the circumferential wall 90 are integrally formed with the cylinder main body 15. The groove bottom section 88, the circumferential wall 89 and the circumferential wall 90 are formed by cutting the cylinder main body 15.

The groove bottom section 88 has a groove bottom surface 88a. The groove bottom surface 88a forms an annular surface about the cylinder axis, and a length in the cylinder axial direction is constant.

The circumferential wall 89 has a large diameter wall surface 89a, an inner circumferential surface 89b and a small diameter wall surface 89c. The large diameter wall surface 89a is constituted by a flat surface parallel to an orthogonal plane of the cylinder axis disposed at the groove bottom section 88 side in the cylinder radial direction in the circumferential wall 89. The large diameter wall surface 89a has a constant width in the cylinder radial direction with a constant inner diameter and a constant outer diameter, and forms an annular shape about the cylinder axis. The inner circumferential surface 89b extends further inside in the cylinder radial direction than the large diameter wall surface 89a in the circumferential wall 89 and closer to the cylinder opening side than the large diameter wall surface 89a along the cylinder axial direction. The inner circumferential surface 89b is constituted by an annular surface about the cylinder axis, and a length in the cylinder axial direction is constant. The small diameter wall surface 89c is constituted by a flat surface parallel to an orthogonal plane of the cylinder axis further inside in the cylinder radial direction than the inner circumferential surface 89b in the circumferential wall 89. The small diameter wall surface 89c also has a constant width in the cylinder radial direction with a constant inner diameter and a constant outer diameter, and forms an annular shape about the cylinder axis.

A round chamfer is formed at a boundary position between a large diameter side of the large diameter wall surface 89a and a cylinder opening side of the groove bottom surface 88a. A round chamfer is formed at a boundary position between a small diameter side of the large diameter wall surface 89a and a cylinder bottom side of the inner circumferential surface 89b. A round chamfer is formed at a boundary position between a cylinder opening side of the inner circumferential surface 89b and a large diameter side of the small diameter wall surface 89c. A round chamfer is formed at a boundary position between a small diameter side of the small diameter wall surface 89c and a cylinder opening side other than the circumferential groove 32 of the sliding inner diameter section 29.

As described above, in the circumferential wall 89, a step section 91 in which the inside in the radial direction is disposed closer to the cylinder opening side than the outside in the radial direction is formed at an intermediate section in the radial direction thereof. The step section 91 has a portion of the inner circumferential surface 89b side of the large diameter wall surface 89a, the inner circumferential surface 89b, and a portion of the inner circumferential surface 89b side of the small diameter wall surface 89c.

The circumferential wall 90 opposite to the circumferential wall 89 has a wall surface 90a and a tapered surface 90b. The wall surface 90a is constituted by a flat surface parallel to an orthogonal plane of the cylinder axis disposed at the groove bottom section 88 side in the cylinder radial direction in the circumferential wall 90. The wall surface 90a has a constant width in the cylinder radial direction with a constant inner diameter and a constant outer diameter, and forms an annular shape about the cylinder axis. The tapered surface 90b is disposed further inside in the cylinder radial direction than the wall surface 90a in the circumferential wall 90, and extends to have a diameter reduced from an inner edge section in the cylinder radial direction of the wall surface 90a to the cylinder bottom side as it goes toward the cylinder bottom side. The tapered surface 90b has a constant width in the cylinder radial direction with a constant inner diameter and a constant outer diameter, and is disposed in an annular shape about the cylinder axis except for the communication groove 51. The tapered surface 90b has a maximum diameter smaller than a diameter of the inner circumferential surface 89b of the circumferential wall 89, and an angle between the tapered surface 90b and the wall surface 90a is an obtuse angle. Accordingly, the tapered surface 90b is formed at an opening side (inside in the radial direction) of the circumferential groove 32 in the circumferential wall 90 of the cylinder bottom side of the circumferential groove 32, and the wall surface 90a is formed adjacent to the groove bottom section 88 side in the cylinder radial direction of the tapered surface 90b. A round chamfer is formed at a boundary position between a large diameter side of the wall surface 90a and a cylinder bottom side of the groove bottom surface 88a. A round chamfer is formed at a boundary position between a small diameter side of the tapered surface 90b and a cylinder bottom side rather than the circumferential groove 32 of the sliding inner diameter section 29.

The step section 75 formed at the primary piston 18 has a cylindrical surface 75a, a tapered surface 75b and a tapered surface 75c. The cylindrical surface 75a has a diameter smaller than the outer diameter surface 74 formed in a cylindrical surface shape having a largest diameter in the primary piston 18, and a constant width in the axial direction. The tapered surface 75b extends to be inclined to have a diameter increased from the edge section of the cylinder opening side of the cylindrical surface 75a toward the cylinder opening side, and connected to a portion closer to the cylinder opening side than the step section 75 of the outer diameter surface 74. The tapered surface 75c extends to be inclined to have a diameter increased from the edge section of the cylinder bottom side of the cylindrical surface 75a toward the cylinder bottom side, and connected to a portion closer to the cylinder bottom side than the step section 75 of the outer diameter surface 74.

The cylindrical surface 75a, the tapered surface 75b and the tapered surface 75c are formed about the central axis of the primary piston 18 like the outer diameter surface 74. The port 76 in constant communication with the primary pressure chamber 85 is formed at a position overlapping on both of the cylindrical surface 75a and the tapered surface 75b. In other words, in the port 76, an end section of the cylinder bottom side is disposed at the cylindrical surface 75a, and an end section of the cylinder opening side is disposed at the tapered surface 75b.

The piston seal 45 disposed at the circumferential groove 32 has a base section 101, an inner circumferential lip section 102, an outer circumferential lip section 103 and an intermediate protrusion section 104. The base section 101 is disposed at the cylinder opening side (the right side of FIG. 2) in the piston seal 45, and forms an annular plate shape parallel to an orthogonal plane of an axis of the piston seal 45. The inner circumferential lip section 102 has a circular ring shape protruding from the inner circumferential end of the base section 101 toward the cylinder bottom side (the left side of FIG. 2) in the cylinder axial direction. The outer circumferential lip section 103 has a circular ring shape protruding from the outer circumferential end of the base section 101 toward the cylinder bottom side in the cylinder axial direction. The intermediate protrusion section 104 has a circular ring shape disposed between the outer circumferential lip section 103 and the inner circumferential lip section 102 and protruding from the base section 101 toward the cylinder bottom side in the cylinder axial direction to a forward side of the outer circumferential lip section 103.

The inner circumferential lip section 102 of the piston seal 45 comes in sliding contact with an outer circumferential surface 18a of the primary piston 18 moving in the cylinder axial direction, the outer circumferential surface 18a including the cylindrical surface 75a, the tapered surface 75b, the tapered surface 75c and the outer diameter surface 74. In addition, the outer circumferential lip section 103 of the piston seal 45 abuts the groove bottom section 88 of the circumferential groove 32 of the cylinder main body 15.

Figure 3A:
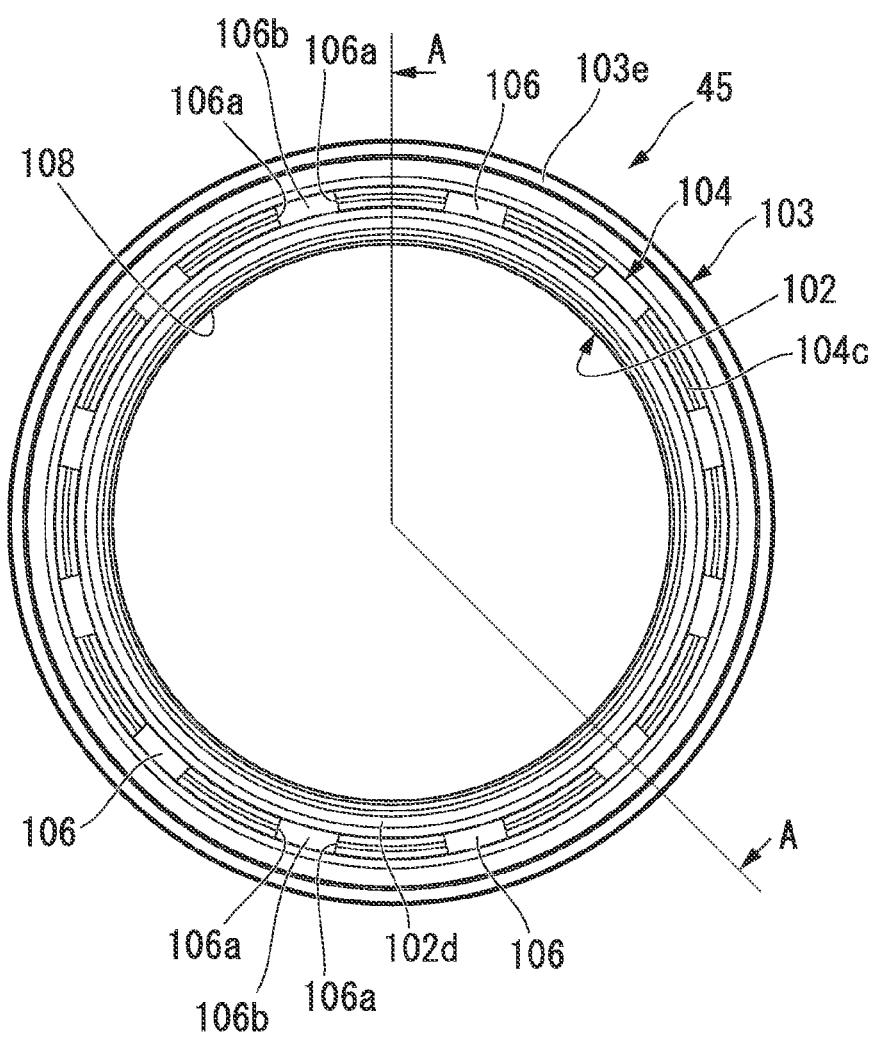
FIG. 3A is a front view showing a piston seal of the master cylinder of the first embodiment.
Figure 3B:
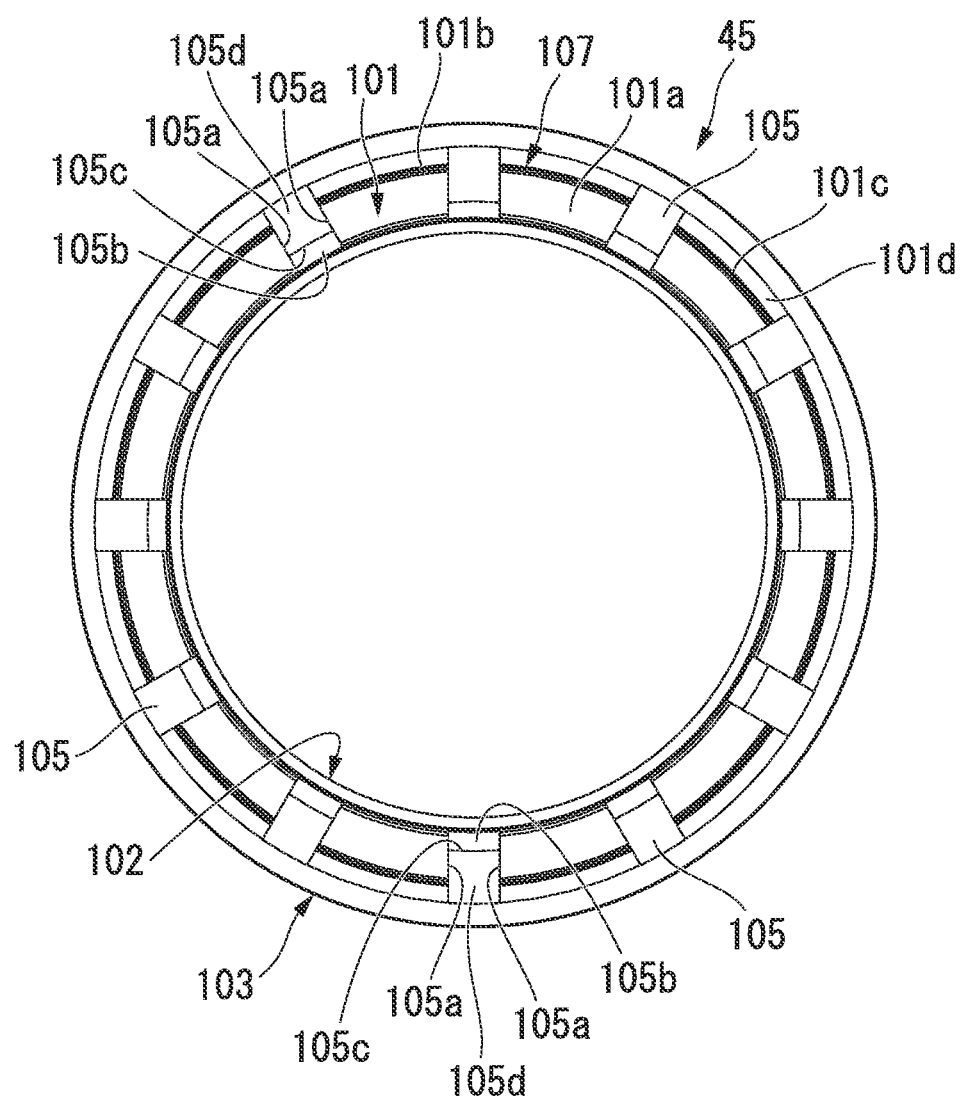
FIG. 3B is a rear view showing the piston seal of the master cylinder of the first embodiment.
Figure 4:
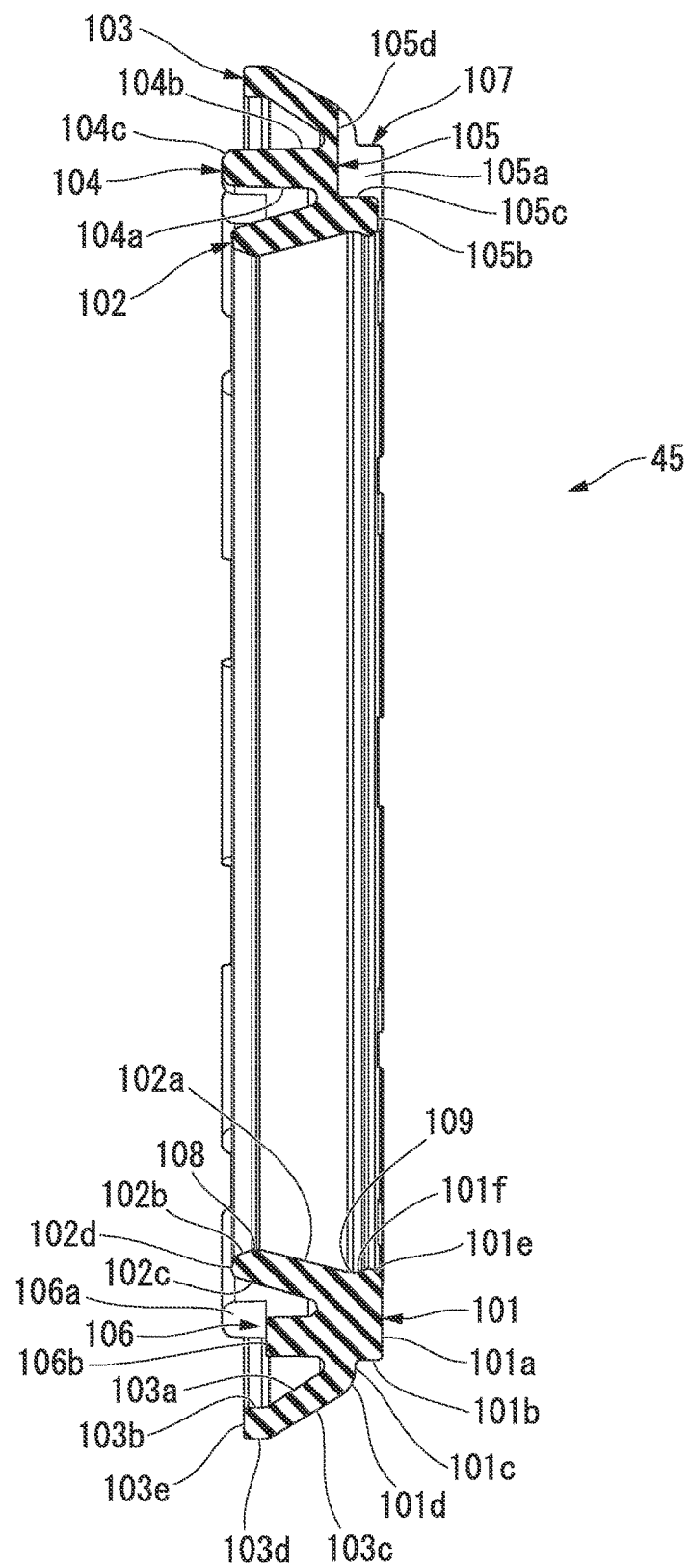
FIG. 4 is a cross-sectional view taken along line A-A of FIG. 3A showing the piston seal of the master cylinder of the first embodiment.

Referring to FIGS. 3A to 4, the piston seal 45 in a natural state before the piston seal 45 is incorporated with the master cylinder 11 will be described. The base section 101, the inner circumferential lip section 102, the outer circumferential lip section 103 and the intermediate protrusion section 104 have the same central axis, and the central axis serves as the central axis of the piston seal 45. Hereinbelow, the base section 101 sides in the axial direction will be described as a back side, and a protrusion side of the inner circumferential lip section 102, the outer circumferential lip section 103 and the intermediate protrusion section 104 in the axial direction will be described as a front side.

As shown in FIG. 3A, in the piston seal 45, a plurality of (specifically, 12 in the embodiment) surface side groove sections (communication sections) 106 are formed at a front side of the intermediate protrusion section 104, i.e., a front end side, at equal intervals in the circumferential direction. In addition, as shown in FIG. 3B, in the piston seal 45, a plurality of (specifically, 12 in the embodiment) back side groove sections 105 are formed at a back side of the base section 101 at equal intervals in the circumferential direction. Further, the plurality of back side groove sections 105 may not be formed, but one or more back side groove sections 105 may be formed. In addition, when the plurality of back side groove sections 105 are formed, they may not be formed at equal intervals in the circumferential direction.

As shown in FIG. 4, the base section 101 has a small diameter rear surface 101a, an outer circumferential surface 101b, a large diameter rear surface 101c and a curved surface 101d. Here, as shown in FIG. 3B, since the plurality of back side groove sections 105 are formed at the base section 101 at intervals in the circumferential direction, the small diameter rear surface 101a, the outer circumferential surface 101b, the large diameter rear surface 101c and the curved surface 101d are divided by the back side groove sections 105 to be intermittently formed at equal intervals in the circumferential direction.

As shown in FIG. 4, the small diameter rear surface 101a is disposed at an end section of the rearmost side in the axial direction of the piston seal 45. The small diameter rear surface 101a is formed such that a part of a plane thereof is intermittently configured on the same plane parallel to the orthogonal plane of the axis of the piston seal 45. The small diameter rear surface 101a has a constant width in the radial direction with a constant inner diameter and a constant outer diameter, and is disposed on the same circle about the central axis of the piston seal 45.

The outer circumferential surface 101b is disposed outside in the radial direction of the small diameter rear surface 101a and extends from the small diameter rear surface 101a toward the front side in the axial direction. The outer circumferential surface 101b has a constant diameter and a constant length in the axial direction, and is formed such that a part of the cylindrical surface is intermittently configured on the same cylindrical surface about the central axis of the piston seal 45.

The large diameter rear surface 101c extends from the front side in the axial direction of the outer circumferential surface 101b outward in the radial direction. The large diameter rear surface 101c is formed such that a part of the plane is intermittently configured on the same plane parallel to the orthogonal plane of the axis of the piston seal 45. The large diameter rear surface 101c has a constant width in the radial direction with a constant inner diameter and a constant outer diameter, and is disposed on the same circle about the central axis of the piston seal 45.

The curved surface 101d is inclined to be disposed closer to the front side as it goes outward in the radial direction. In the curved surface 101d, a shape of a cross section including the central axis of the piston seal 45 is an arc shape having a center inside the base section 101. The curved surface 101d has a constant width in the cylinder radial direction with a constant inner diameter and a constant outer diameter. The curved surface 101d is formed such that a portion of the cylindrical surface is intermittently configured on the same cylindrical surface about the central axis of the piston seal 45.

A round chamfer is formed at a boundary position between the small diameter rear surface 101a and the outer circumferential surface 101b. A round chamfer is formed at a boundary position between the outer circumferential surface 101b and the large diameter rear surface 101c.

Accordingly, the base section 101 has a step difference section 107 formed such that a back side thereof is disposed closer to an outer circumferential side than a center in an intermediate section in the radial direction, and the inside in the radial direction is disposed closer to the back side than the outside in the radial direction. In other words, in the step difference section 107, the inner circumferential side is longer in the axial direction than the outer circumferential side. The step difference section 107 has a part of the outer circumferential surface 101b side of the small diameter rear surface 101a, the outer circumferential surface 101b, and a part of the outer circumferential surface 101b side of the large diameter rear surface 101c.

The plurality of back side groove sections 105 have a pair of opposite surfaces 105a that are shown in FIG. 3B, and a small diameter bottom surface 105b, an intermediate step difference surface 105c and a large diameter bottom surface 105d that are shown in FIG. 4. The pair of opposite surfaces 105a shown in FIG. 3B are formed along a radial line of the piston seal 45 in the axial direction, and are parallel to each other. The small diameter bottom surface 105b shown in FIG. 4 is disposed at the back side in the back side groove section 105. The plurality of small diameter bottom surfaces 105b of the plurality of back side groove sections 105 shown in FIG. 3B are formed such that a part thereof is intermittently configured on the same plane parallel to the orthogonal plane of the axis of the piston seal 45. The plurality of small diameter bottom surfaces 105b have a constant width in the radial direction with a constant inner diameter and a constant outer diameter, and are disposed on the same circle about the central axis of the piston seal 45.

The intermediate step difference surface 105c shown in FIG. 4 is disposed outside in the radial direction of the small diameter bottom surfaces 105b that constitute the same back side groove section 105, and extends from the small diameter bottom surfaces 105b to the front side in the axial direction. The plurality of intermediate step difference surfaces 105c of the plurality of back side groove sections 105 shown in FIG. 3B have a constant diameter and a constant length in the axial direction, and are formed such that a part of the cylindrical surface is intermittently configured on the same cylindrical surface about the central axis of the piston seal 45.

The large diameter bottom surface 105d shown in FIG. 4 extends from the front side in the axial direction of the intermediate step difference surface 105c that constitutes the same back side groove section 105 outward in the radial direction. The plurality of large diameter bottom surfaces 105d of the plurality of back side groove sections 105 shown in FIG. 3B are formed such that a part of the plane is intermittently configured on the same plane parallel to the orthogonal plane of the axis of the piston seal 45. As shown in FIG. 4, a round chamfer is formed at a boundary position between the small diameter bottom surfaces 105b and the intermediate step difference surface 105c. A round chamfer is formed at a boundary position between the intermediate step difference surface 105c and the large diameter bottom surface 105d.

The inner circumferential lip section 102 is formed in a tapered cylindrical shape having a diameter that is slightly reduced as a whole as it moves away from the base section 101 in the axial direction. A reduced diameter inner circumferential surface 101e, an increased diameter inner circumferential surface 101f, a reduced diameter inner circumferential surface 102a and an increased diameter inner circumferential surface 102b are formed at inner circumferential sides of the base section 101 and the inner circumferential lip section 102 in sequence from the back side in the axial direction. The reduced diameter inner circumferential surface 101e is formed at the base section 101. The reduced diameter inner circumferential surface 101e is formed to have a tapered shape about the central axis of the piston seal 45 such that a diameter thereof is reduced as it goes toward the front side in the axial direction (i.e., a diameter is contracted). The increased diameter inner circumferential surface 101f is formed at the base section 101.

The increased diameter inner circumferential surface 101f is formed to have a tapered shape about the central axis of the piston seal 45 such that a diameter thereof is increased from the front side in the axial direction of the reduced diameter inner circumferential surface 101e toward the front side in the axial direction (i.e., a diameter is expanded). The reduced diameter inner circumferential surface 102a is formed so as to astride the base section 101 and the inner circumferential lip section 102. The reduced diameter inner circumferential surface 102a extends to form a tapered shape about the central axis of the piston seal 45 such that a diameter thereof is reduced from the front side in the axial direction of the increased diameter inner circumferential surface 101f to be disposed at the front side (i.e., a diameter is contracted). The increased diameter inner circumferential surface 102b is formed at the inner circumferential lip section 102. The increased diameter inner circumferential surface 102b extends to form a tapered shape about the central axis of the piston seal 45 such that a diameter is increased from the front side in the axial direction of the reduced diameter inner circumferential surface 102a to be disposed at the front side (i.e., a diameter is expanded).

A reduced diameter outer circumferential surface 102c is formed at the outer circumferential side of the inner circumferential lip section 102. The reduced diameter outer circumferential surface 102c extends to form a tapered cylindrical shape about the central axis of the piston seal 45 such that a diameter thereof is reduced toward the front side in the axial direction (i.e., a diameter is contracted). A front end surface 102d of the foremost side of the inner circumferential lip section 102 is parallel to the orthogonal plane of the axis of the piston seal 45. The front end surface 102d has a constant width in the radial direction of the piston seal 45 with a constant inner diameter and a constant outer diameter, and forms an annular shape about the central axis of the piston seal 45. A round chamfer is formed at a boundary position between the reduced diameter inner circumferential surface 101e and the increased diameter inner circumferential surface 101f. A round chamfer is formed at a boundary position between the increased diameter inner circumferential surface 101f and the reduced diameter inner circumferential surface 102a. A round chamfer is formed at a boundary position between the reduced diameter inner circumferential surface 102a and the increased diameter inner circumferential surface 102b. A round chamfer is formed at a boundary position between the reduced diameter outer circumferential surface 102c and the front end surface 102d.

Here, in the inner circumferential lip section 102, the boundary portion between the reduced diameter inner circumferential surface 102a and the increased diameter inner circumferential surface 102b is a minimum diameter section 108, an inner diameter of which as a smallest diameter. The minimum diameter section 108 has an annular shape about the central axis of the piston seal 45. The minimum diameter section 108 is a portion of which an inner diameter is smallest in the piston seal 45. In addition, the boundary portion between the increased diameter inner circumferential surface 101f and the reduced diameter inner circumferential surface 102a of the base section 101 is a concave section 109 concaved outward in the radial direction. The concave section 109 also has an annular shape about the central axis of the piston seal 45.

The outer circumferential lip section 103 extends to form a tapered cylindrical shape about the central axis of the piston seal 45 such that a diameter is increased as a whole as it goes toward the front side in the axial direction. An increased diameter inner circumferential surface 103a and an inner circumferential cylindrical surface 103b are formed at the inner circumferential side of the outer circumferential lip section 103 in sequence from the back side in the axial direction. The increased diameter inner circumferential surface 103a extends to form a tapered shape about the central axis of the piston seal 45 such that a diameter is increased toward the front side in the axial direction (i.e., a diameter is expanded). The inner circumferential cylindrical surface 103b extends from the front side of the increased diameter inner circumferential surface 103a to form a cylindrical surface shape about the central axis of the piston seal 45.

At the outer circumferential sides of the outer circumferential lip section 103 and the base section 101, in sequence from the back side in the axial direction, the outer circumferential surface 101b, the large diameter rear surface 101c and the curved surface 101d are formed, and further, an increased diameter outer circumferential surface 103c and an outer circumferential cylindrical surface 103d are formed. The increased diameter outer circumferential surface 103c is formed so as to astride the base section 101 and the outer circumferential lip section 103. The increased diameter outer circumferential surface 103c extends from the front side of the curved surface 101d of the base section 101 to form a tapered shape about the central axis of the piston seal 45 such that a diameter is increased toward the front side in the axial direction (i.e., a diameter is expanded). The outer circumferential cylindrical surface 103d extends from the front side of the increased diameter outer circumferential surface 103c to form a cylindrical surface shape about the central axis of the piston seal 45. A front end surface 103e of the front side of the outer circumferential lip section 103 is parallel to the orthogonal plane of the axis of the piston seal 45. The front end surface 103e has a constant width in the radial direction of the piston seal 45 with a constant inner diameter and a constant outer diameter, and forms an annular shape about the central axis of the piston seal 45. A round chamfer is formed at a boundary position between the increased diameter inner circumferential surface 103a and the inner circumferential cylindrical surface 103b. A round chamfer is formed at a boundary position between the inner circumferential cylindrical surface 103b and the front end surface 103e. A round chamfer is formed at a boundary position between the increased diameter outer circumferential surface 103c and the outer circumferential cylindrical surface 103d. A round chamfer is formed at a boundary position between the outer circumferential cylindrical surface 103d and the front end surface 103e.

An increased diameter inner circumferential surface 104a is formed at an inner circumferential side of the intermediate protrusion section 104. The increased diameter inner circumferential surface 104a extends to form a tapered shape about the central axis of the piston seal 45 such that a diameter thereof is increased toward the front side in the axial direction. A reduced diameter outer circumferential surface 104b is formed at an outer circumferential side of the intermediate protrusion section 104. The reduced diameter outer circumferential surface 104b extends to form a tapered shape about the central axis of the piston seal 45 such that a diameter thereof is reduced toward the front side in the axial direction.

A front end surface 104c of the front side of the intermediate protrusion section 104 is parallel to the orthogonal plane of the axis of the piston seal 45, and has a constant width in the radial direction of the piston seal 45 with a constant inner diameter and a constant outer diameter. As shown in FIG. 3A, the front end surface 104c has a plurality of surface side groove sections 106. Accordingly, the plurality of surface side groove sections 106 are formed such that a part of the plane is intermittently configured on the same plane parallel to the orthogonal plane of the axis of the piston seal 45. The front end surface 104c is disposed at a position on the same circle about the central axis of the piston seal 45. As shown in FIG. 4, a round chamfer is formed at a boundary position between the increased diameter inner circumferential surface 104a and the front end surface 104c. A round chamfer is formed at a boundary position between the reduced diameter outer circumferential surface 104b and the front end surface 104c. A round chamfer is formed at a boundary position between the increased diameter inner circumferential surface 104a and the reduced diameter outer circumferential surface 102c of the inner circumferential lip section 102. A round chamfer is formed at a boundary position between the reduced diameter outer circumferential surface 104b and the increased diameter inner circumferential surface 103a of the outer circumferential lip section 103.

The plurality of surface side groove sections 106 are formed to correspond to the plurality of back side groove sections 105, and as shown in FIGS. 3A and 3B, a position in the circumferential direction of the piston seal 45 is deviated by a half of a pitch of the back side groove sections 105. The plurality of surface side groove sections 106 each have a pair of opposite surfaces 106a and a bottom surface 106b. The pair of opposite surfaces 106a are disposed along a radial line of the piston seal 45 in the axial direction, and parallel to each other. As shown in FIG. 4, the bottom surface 106b is disposed at an end section of the rearmost side in the surface side groove section 106. The plurality of bottom surfaces 106b of the plurality of surface side groove sections 106 shown in FIG. 3A are disposed such that parts thereof are intermittently configured on the same plane parallel to the orthogonal plane of the axis of the piston seal 45. Further, the plurality of surface side groove sections 106 may not be formed but one or more surface side groove sections 106 may be formed. In addition, there is no need to form the surface side groove sections 106 to be equal in number to the back side groove sections 105.

Next, the piston seal 45 in the basic state (the non-braking state before the brake pedal is manipulated) will be described with reference to mainly FIGS. 2, 5A and 5B. The basic state of the piston seal 45 is a state in which the piston seal 45 is incorporated in the circumferential groove 32 of the cylinder main body 15 to come in appropriate contact with an intermediate position in the axial direction of the cylindrical surface 75a of the step section 75 of the primary piston 18, abuts the circumferential wall 89 of the cylinder opening side (the right side of FIG. 2) of the circumferential groove 32, and is spaced apart from the circumferential wall 90 of the cylinder bottom side (the left side of FIG. 2) of the circumferential groove 32.

When the piston seal 45 is in the basic state, in the piston seal 45, the base section 101 is disposed at a position closest to the cylinder opening side, and the step difference section 107 formed at the base section 101 is fitted to the step section 91 formed at the circumferential groove 32. Here, in the basic state, in the piston seal 45, as the large diameter rear surface 101c of the base section 101 abuts the large diameter wall surface 89a of the circumferential wall 89, further movement toward the opening section 16 in the cylinder axial direction with respect to the circumferential groove 32 is restricted.

In this state, a gap is provided between the small diameter rear surface 101a of the base section 101 and the small diameter wall surface 89c of the circumferential wall 89 opposite thereto in the cylinder axial direction. In addition, a gap is provided between the front end surface 104c of the intermediate protrusion section 104 and the wall surface 90a of the circumferential wall 90 opposite thereto in the cylinder axial direction. In this way, even in a state in which the base section 101 abuts the circumferential wall 89, the small diameter bottom surfaces 105b, the intermediate step difference surface 105c and the large diameter bottom surface 105d of the back side groove section 105 formed in the base section 101 are separated from the circumferential wall 89 in the cylinder axial direction. Accordingly, the inside of the back side groove section 105 becomes a communication path 111 that comes in constant communication with the primary supply path 48 and the groove bottom section 88 side of the circumferential groove 32 between the step difference section 107 and the step section 91. The plurality of communication paths 111 are formed at equal intervals in the cylinder circumferential direction.

Figure 5A:
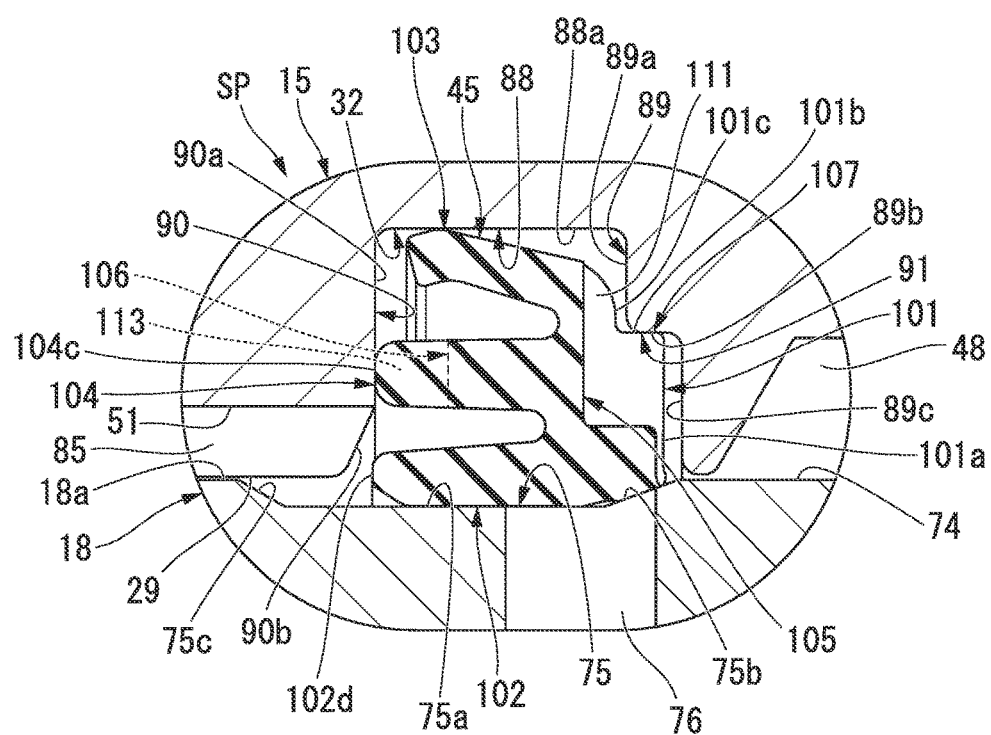
FIG. 5A is a partially enlarged cross-sectional view showing the major part of the master cylinder of the first embodiment, showing a state in which an invalid stroke of the piston is canceled.
Figure 5B:
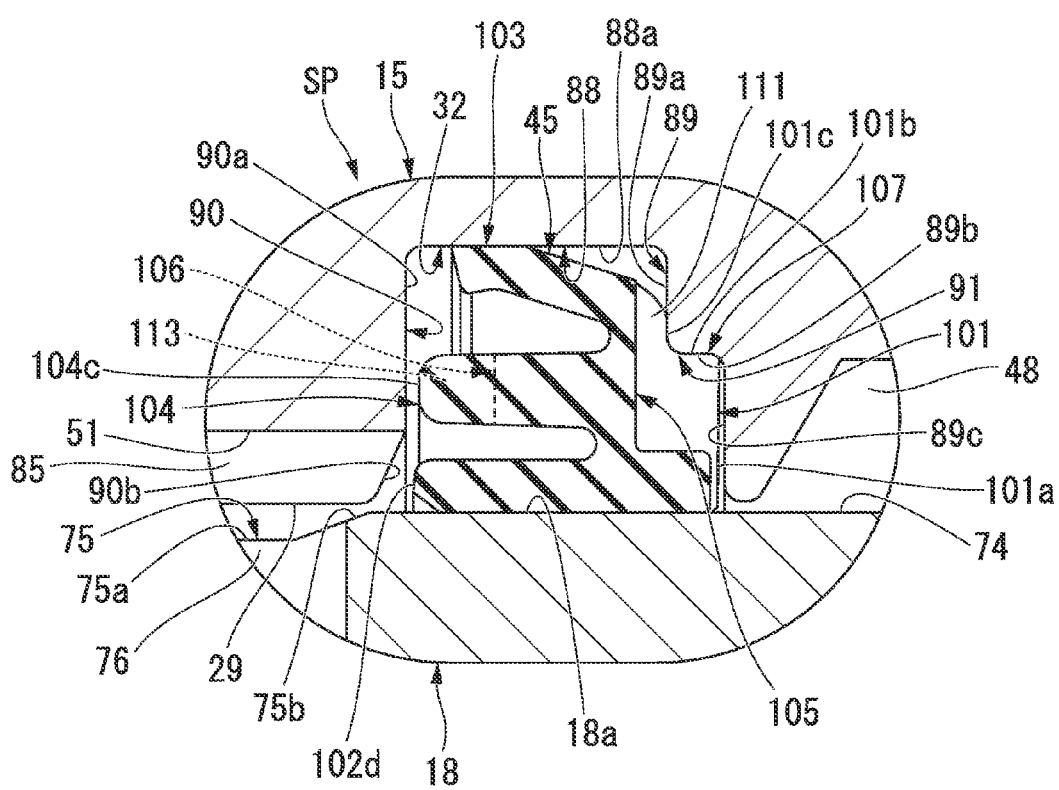
FIG. 5B is a partially enlarged cross-sectional view of the major part of the master cylinder of the first embodiment, showing a state in which a fluid pressure is generated.

As shown in FIG. 5A, as the front end surface 104c of the intermediate protrusion section 104 abuts the wall surface 90a of the circumferential wall 90 of the cylinder bottom side of the circumferential groove 32, further movement of the piston seal 45 toward the cylinder bottom side with respect to the circumferential groove 32 is basically restricted. That is, the piston seal 45 is basically movable in the cylinder axial direction within a range from a state in which it abuts the large diameter wall surface 89a of the circumferential wall 89 to a state in which it abuts the wall surface 90a of the circumferential wall 90 in the circumferential groove 32.

Then, a maximum value of an overlapping amount in the cylinder axial direction between the outer circumferential surface 101b of the step difference section 107 of the base section 101 and the inner circumferential surface 89b of the step section 91 of the circumferential groove 32 is larger than a movable distance in the cylinder axial direction in the circumferential groove 32 of the piston seal 45 in consideration of a deformation margin with respect to a moving distance in the cylinder axial direction. In other words, the shorter of a distance in the cylinder axial direction between the small diameter rear surface 101a and the large diameter rear surface 101c serving as a step difference amount of the step difference section 107 and a distance in the cylinder axial direction between the large diameter wall surface 89a and the small diameter wall surface 89c serving as a step difference amount of the step section 91 (in this case, a distance in the cylinder axial direction between the small diameter rear surface 101a and the large diameter rear surface 101c) is set to be larger than a movable distance in the cylinder axial direction in the circumferential groove 32 of the piston seal 45. Accordingly, the inner circumferential surface 89b of the step section 91 of the circumferential groove 32 always overlaps and abuts the outer circumferential surface 101b of the step difference section 107 of the piston seal 45 in the cylinder axial direction. That is, for example, even when the piston seal 45 is elastically deformed, a fitting state of the step difference section 107 of the base section 101 into the step section 91 of the circumferential groove 32 is always maintained.

In the basic state, in the piston seal 45, the inner circumferential lip section 102 disposed at the innermost inner circumferential side comes in contact with the cylindrical surface 75a of the step section 75 in the outer circumferential surface 18a of the primary piston 18 in the inner circumferential section. Here, in the piston seal 45, the boundary side between the reduced diameter inner circumferential surface 101e and the increased diameter inner circumferential surface 101f of the base section 101 shown in FIG. 4 and the boundary side between the reduced diameter inner circumferential surface 102a and the increased diameter inner circumferential surface 102b of the inner circumferential lip section 102 come in contact with the cylindrical surface 75a shown in FIG. 2, and the piston seal 45 is deformed in a cylindrical surface shape having a diameter increased before deformation conforming to the cylindrical surface 75a. Accordingly, the base section 101 and the inner circumferential lip section 102 come in contact with the cylindrical surface 75a with interference. Here, the minimum diameter section 108 having a smallest inner diameter shown in FIG. 4 is a maximum interference area in which interference with the cylindrical surface 75a is maximized.

In the basic state shown in FIG. 2, in the piston seal 45, the outer circumferential lip section 103 disposed at the outermost circumferential side abuts the groove bottom section 88 of the circumferential groove 32 at the boundary position between the increased diameter outer circumferential surface 103c and the outer circumferential cylindrical surface 103d to be bent inward in the radial direction. Here, the intermediate protrusion section 104 is in the same state as the natural state, and the front end surface 104c is parallel to the orthogonal plane of the cylinder axis. The intermediate protrusion section 104 extends to be closer to the cylinder bottom side (the left side of FIG. 2) than the outer circumferential lip section 103 with the same length as the inner circumferential lip section 102 elastically deformed by the primary piston 18.

Here, in the basic state, as described above, in the intermediate protrusion section 104, the entire front end surface 104c matches a position in the cylinder radial direction to the wall surface 90a of the circumferential wall 90 of the circumferential groove 32. For this reason, the intermediate protrusion section 104 faces the wall surface 90a in the cylinder axial direction, and disposed to able to abut the wall surface 90a. However, here, the intermediate protrusion section 104 is separated from the circumferential wall 90 including the wall surface 90a in the cylinder axial direction.

In the basic state, in the inner circumferential lip section 102, the front end surface 102d matches a position in the cylinder radial direction to the tapered surface 90b of the circumferential wall 90 of the circumferential groove 32 and the tapered surface 75c of the step section 75 of the primary piston 18, and is disposed to face the tapered surface 90b and the tapered surface 75c. However, here, the inner circumferential lip section 102 is separated from the circumferential wall 90 including the tapered surface 90b in the cylinder axial direction, and is also separated from the tapered surface 75c in the cylinder axial direction. Here, in the front end surface 102d of the inner circumferential lip section 102, the position in the cylinder radial direction does not overlap the wall surface 90a of the circumferential wall 90.

As shown in FIG. 2, when there is no input from the brake pedal (not shown) side and the primary piston 18 is in the basic position (the non-braking position) in which the port 76 is opened to the opening groove 47, in the piston seal 45, the inner circumferential sections of the inner circumferential lip section 102 and the base section 101 are disposed at the position of the cylindrical surface 75a of the step section 75 of the primary piston 18, and the inner circumferential section of the base section 101 overlaps the position in the cylinder axial direction of a part of the port 76.

Then, when there is an input from the brake pedal side and the primary piston 18 moves toward the cylinder bottom side (the left side of FIG. 2), the primary piston 18 abuts the reduced diameter inner circumferential surface 101e of the base section 101 of the piston seal 45 in the tapered surface 75b of the cylinder opening side of the step section 75, and presses the piston seal 45 toward the cylinder bottom side. Then, the piston seal 45 integrally moves with the primary piston 18. As a result, the piston seal 45 moves toward the circumferential wall 90 in the circumferential groove 32, as shown in FIG. 5A, the small diameter rear surface 101a of the base section 101 enlarges a distance in the cylinder axial direction between the piston seal 45 and the small diameter wall surface 89c, and the large diameter rear surface 101c is spaced apart from the large diameter wall surface 89a in the cylinder axial direction. Then, in the piston seal 45, the front end surface 104c of the intermediate protrusion section 104 abuts the wall surface 90a of the circumferential wall 90 to stop with respect to the cylinder main body 15. In this state, the inside of the surface side groove section 106 of the front end side of the intermediate protrusion section 104 constitutes a communication path 113 that brings the primary pressure chamber 85 and the groove bottom section 88 side of the circumferential groove 32 in communication with each other. The plurality of communication paths 113 are formed at equal intervals in the cylinder circumferential direction. The communication paths 113 bring the primary pressure chamber 85 and the groove bottom section 88 side of the circumferential groove 32 in constant communication with each other. Further, even in this case, a state in which the outer circumferential surface 101b of the step difference section 107 of the piston seal 45 abuts the inner circumferential surface 89b of the step section 91 of the circumferential wall 89 is maintained.

Then, when the primary piston 18 further moves toward the cylinder bottom side, the intermediate protrusion section 104 abuts the circumferential wall 90. Accordingly, the base section 101 of the piston seal 45 basically stopped with respect to the primary piston 18 moves the tapered surface 75b of the primary piston 18 over a position beyond the port 76 to close the port 76 as shown in FIG. 5A. Then, communication between the primary supply path 48 and the primary pressure chamber 85 is blocked. After that, when the primary piston 18 further moves toward the cylinder bottom side, a fluid pressure in the primary pressure chamber 85 is basically higher than a fluid pressure in the primary supply path 48, which is atmospheric pressure, and the brake fluid in the primary pressure chamber 85 is supplied from the primary ejection path 27 shown in FIG. 1 into the brake cylinder of the wheel side. That is, as shown in FIG. 5A, when the port 76 of the primary piston 18 is closed by the piston seal 45, an invalid stroke of the primary piston 18 is canceled. Further, when the base section 101 of the piston seal 45 moves over the tapered surface 75b of the primary piston 18, since the step difference section 107 abuts the step section 91 of the circumferential wall 89 in the radial direction to suppress deformation in an expanding radial direction, the port 76 is securely closed by further pressing the piston seal 45 against the tapered surface 75b.

Here, when the base section 101 of the piston seal 45 moves over the tapered surface 75b as described above, a force from the tapered surface 75b outward in the radial direction and toward the cylinder bottom side is applied to the base section 101 of the piston seal 45. Here, since the outer circumferential surface 101b of the step difference section 107 abuts the inner circumferential surface 89b of the step section 91 of the circumferential wall 89, the base section 101 of the piston seal 45 is pressed inward in the radial direction to resist the force. Accordingly, overturning in which the outer diameter side of the base section 101 of the piston seal 45 moves toward the cylinder bottom side and the inner diameter side of the base section 101 moves toward the cylinder opening side (the right side of FIGS. 5A and 5B) can be suppressed. As a result, so-called roll of the piston seal 45 in which the outer circumferential lip section 103 moves toward the cylinder bottom side and the inner circumferential lip section 102 moves toward the cylinder opening side can be suppressed.

After the port 76 is closed, when the primary piston 18 further moves toward the cylinder bottom side, the base section 101 of the piston seal 45 rides over the tapered surface 75b to go over the outer diameter surface 74. Along with this, the inner circumferential lip section 102 goes over the tapered surface 75b. After that, the inner circumferential lip section 102 goes over the outer diameter surface 74 as shown in FIG. 5B.

Further, in a state in which the piston seal 45 is disposed closer to the cylinder opening side than the port 76, the piston seal 45 blocks communication between the primary pressure chamber 85 and the primary supply path 48 via the port 76. Accordingly, when the primary piston 18 moves toward the cylinder bottom side, the brake fluid in the primary pressure chamber 85 is raised, and supplied from the primary ejection path 27 shown in FIG. 1 into the brake cylinder of the wheel side. The piston seal 45 moves toward the circumferential wall 89 in the circumferential groove 32 when the fluid pressure in the primary pressure chamber 85 is increased. Accordingly, as shown in FIG. 5B, the base section 101 abuts the large diameter wall surface 89a of the circumferential wall 89 in the large diameter rear surface 101c while the intermediate protrusion section 104 is spaced apart from the circumferential wall 90.

When a brake pedal (not shown) begins to return in order to release the braking from the state in which the primary piston 18 moves toward the cylinder bottom side as described above, the primary piston 18 is returned to the basic position shown in FIG. 2 by the interval adjustment section 79 shown in FIG. 1. A capacity of the primary pressure chamber 85 is enlarged by movement of the primary piston 18. Here, when the returning of the brake fluid via the brake pipe cannot follow an increase in capacity of the primary pressure chamber 85, after the fluid pressure of the primary supply path 48, which is atmospheric pressure, is equalized to the fluid pressure of the primary pressure chamber 85, the fluid pressure in the primary pressure chamber 85 becomes a negative pressure, and the fluid pressure of the primary pressure chamber 85 is lower than the fluid pressure of the primary supply path 48, which is atmospheric pressure.

Figure 6A:
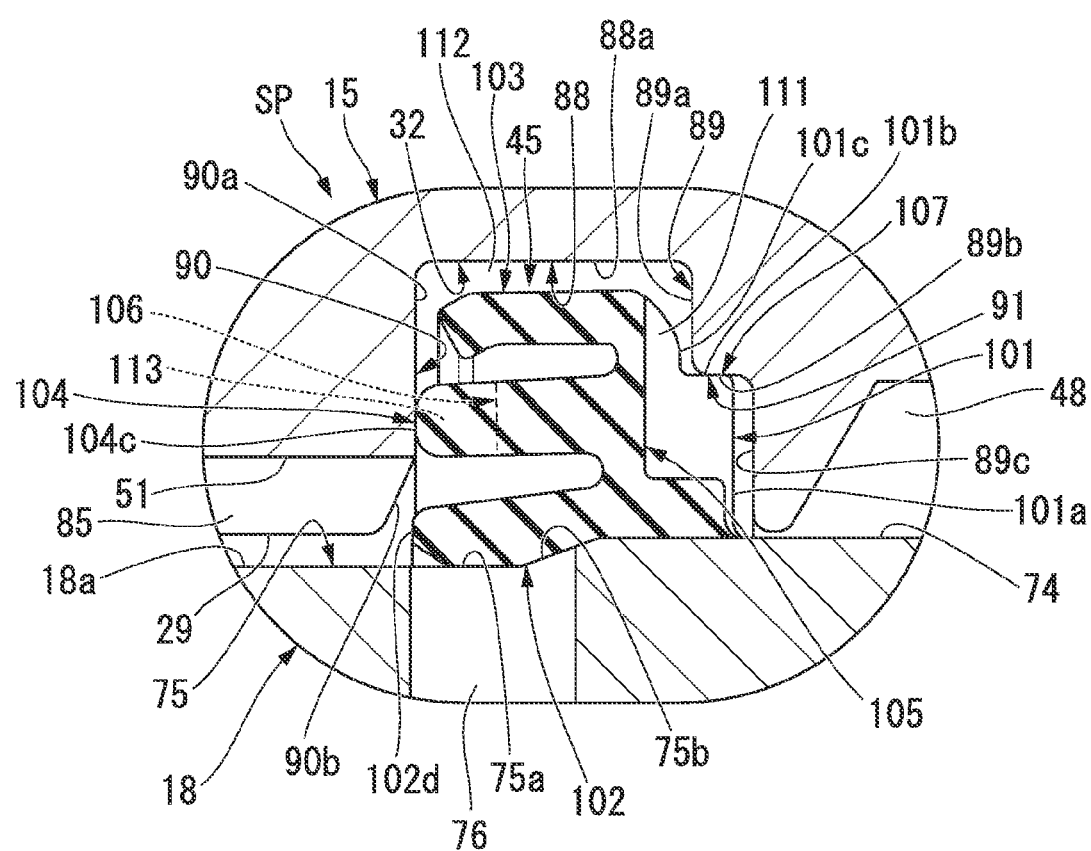
FIG. 6A is a partially enlarged cross-sectional view of the major part of the master cylinder of the first embodiment, showing a state in which a brake fluid is supplied by returning of the piston.

Then, as shown in FIG. 6A, the piston seal 45 moves toward the circumferential wall 90 in the circumferential groove 32 by the negative pressure in the primary pressure chamber 85. Accordingly, the small diameter rear surface 101a of the base section 101 enlarges the distance in the cylinder axial direction from the small diameter wall surface 89c, and the large diameter rear surface 101c is spaced apart from the large diameter wall surface 89a in the cylinder axial direction. Then, the front end surface 104c of the intermediate protrusion section 104 abuts the wall surface 90a of the circumferential wall 90 and stops. Further, the outer circumferential lip section 103 of the piston seal 45 is deformed to be spaced apart from the groove bottom section 88 by the negative pressure in the primary pressure chamber 85. Accordingly, the brake fluid from the primary supply path 48 flows toward the groove bottom section 88 side of the circumferential groove 32 via the communication path 111 in the back side groove section 105, and flows to the primary pressure chamber 85 via a flow path 112 of the gap between the outer circumferential lip section 103 and the groove bottom section 88, and the communication path 113 between the surface side groove section 106 formed by the intermediate protrusion section 104 and the circumferential wall 90 of the circumferential groove 32. Accordingly, the brake fluid from the primary supply path 48 can be supplied into the primary pressure chamber 85, and the fluid pressure in the primary pressure chamber 85 can be returned to atmospheric pressure from the negative pressure state.

In the master cylinder disclosed in the above-mentioned Patent Literature 1, a cup seal that functions as a valve configured to assist communication/release with a pressure chamber of a reservoir tank is installed, and a spacer ring is installed to support the cup seal not to move by the pressure from the pressure chamber. Then, since a portion in which a gap between the piston and the spacer ring is increased is generated when the spacer ring is moved by a weight thereof, and the cup seal intrudes at the portion, the spacer ring is attached or concavo-convexly fitted to the rear surface of the piston seal to prevent the intrusion. In this structure, the number of parts may be increased.

In the master cylinder 11, when the brake fluid is filled in the secondary pressure chamber 68 and the primary pressure chamber 85, forced pumping is performed to pump the brake fluid pressurized from the secondary supply path 38 and the primary supply path 48 side while performing vacuum suction from the secondary ejection path 26 and the primary ejection path 27 side. Upon such forced pumping, for example, since the fluid pressure in the primary pressure chamber 85 becomes a negative pressure and the fluid pressure in the primary supply path 48 becomes a positive pressure higher than atmospheric pressure, the pressure difference therebetween is increased to be larger than upon release of the brake. As a result, upon the forced pumping, the piston seal 45 moves in the circumferential groove 32 more rapidly than upon release of the brake, and a force larger than upon release of the brake is received. In this case, in the piston seal of the related art, the outer diameter side of the base section is deformed to be disposed closer to the bottom section side of the cylinder main body than the inner diameter by the abrupt flow of the brake fluid, and thus the outer circumferential lip section is also deformed such that an opposite side of the base section is adhered to the intermediate protrusion section in the inner circumferential direction. Accordingly, a surface side groove section of the intermediate protrusion section may be closed, or may enter the gap between the piston and the cylinder main body. Then, since the brake fluid does not easily flow, filling the brake fluid into the secondary pressure chamber 68 and the primary pressure chamber 85 of the master cylinder 11 is time-consuming, and manufacturing efficiency or maintenance efficiency of the vehicle may be decreased.

Figure 6B:
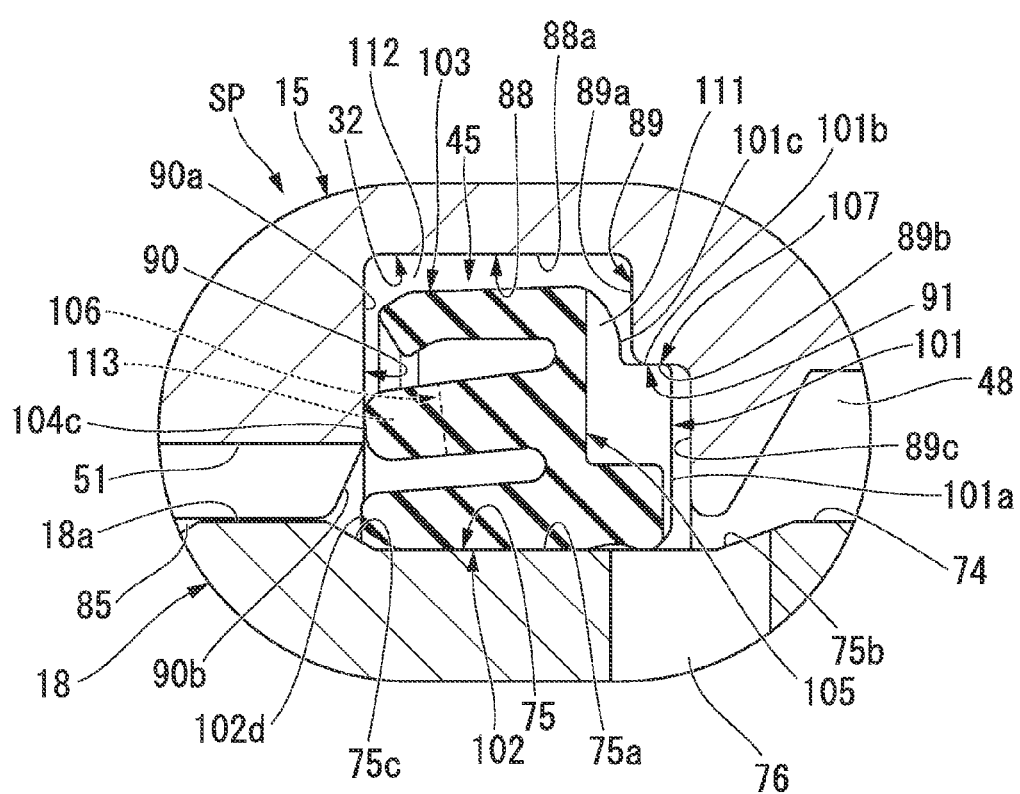
FIG. 6B is a partially enlarged cross-sectional view of the major part of the master cylinder of the first embodiment, showing a state in which the brake fluid is pumped and filled.

On the other hand, according to the master cylinder 11 of the embodiment, the step difference section 107 that is longer in the axial direction at the inner circumferential side is formed at the outer circumferential side of the base section 101 of the piston seal 45, and the step section 91 that the outer circumferential surface 101b of the step difference section 107 always abuts in the cylinder radial direction is formed at the circumferential wall 89 of the cylinder opening side of the circumferential groove 32. For this reason, as shown in FIG. 6B, upon the forced pumping or the like, even when the pressure difference between the primary pressure chamber 85 and the primary supply path 48 is increased and a deforming force is applied by the flow of the brake fluid at this time such that the outer diameter side of the base section 101 is disposed at a position closer to the cylinder bottom side than the inner diameter side of the base section 101, the outer circumferential surface 101b of the step difference section 107 abuts the inner circumferential surface 89b of the step section 91, and overturning, i.e., a variation in posture of the base section 101, is suppressed. That is, the posture of the piston seal 45 can be stabilized. Accordingly, a side of the outer circumferential lip section 103 opposite to the base section 101 can be restricted from being largely deformed in the inner radial direction, and the outer circumferential lip section 103 can be restricted from covering the surface side groove section 106 of the intermediate protrusion section 104 or the outer circumferential lip section 103 or the like can be restricted from entering the gap between the cylinder main body 15 and the primary piston 18. As a result, the brake fluid from the primary supply path 48 can appropriately flow into the primary pressure chamber 85 via the communication path 111 in the back side groove section 105, the flow path 112 of the gap between the outer circumferential lip section 103 and the groove bottom section 88, and the communication path 113 in the surface side groove section 106, and manufacturing efficiency or maintenance efficiency of the vehicle can be improved.

In addition, when the base section 101 of the piston seal 45 goes over the tapered surface 75b of the primary piston 18, since the step difference section 107 abuts the step section 91 of the circumferential wall 89 in the radial direction to suppress deformation in the expanding radial direction, the piston seal 45 can be further pressed against the tapered surface 75b to securely close the port 76. Accordingly, the invalid stroke can be further reduced.

[Second Embodiment]

Next, a second embodiment according to the present invention will be described mainly based on FIGS. 7A and 7B focusing on differences from the first embodiment. Further, the same parts as the first embodiment are designated by the same names and the same reference numerals.

In the second embodiment, interference with the primary piston 18 of the piston seal 45 is set to be smaller than in the first embodiment. That is, as described above in the first embodiment, as the step difference section 107 of the piston seal 45 always abuts the step section 91 of the circumferential groove 32, the posture of the piston seal 45 can be stabilized even when the pressure difference between the primary pressure chamber 85 and the primary supply path 48 is increased. From this, interference with the primary piston 18 of the piston seal 45 can be set to a small value. For this reason, in the second embodiment, interference with the primary piston 18 of the piston seal 45 is set to be smaller than in the first embodiment. That is, the reduced diameter inner circumferential surface 101e, the increased diameter inner circumferential surface 101f, the reduced diameter inner circumferential surface 102a and the increased diameter inner circumferential surface 102b of the piston seal 45 in the natural state have larger diameters than those of the first embodiment.

Figure 7A:
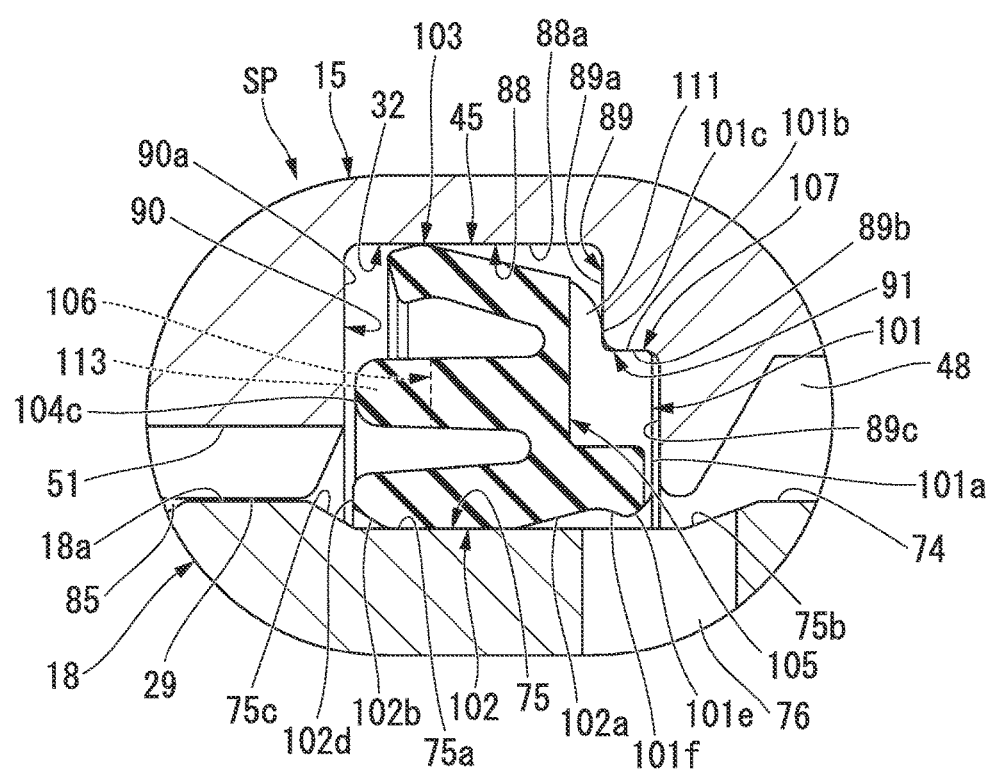
FIG. 7A is a partially enlarged cross-sectional view of a major part of a master cylinder of a second embodiment according to the present invention, showing a state in which a piston is at a basic position.

Then, as shown in FIG. 7A, in the basic state, while the inner circumferential side of the piston seal 45 comes in contact with the cylindrical surface 75a of the step section 75 of the primary piston 18, the reduced diameter inner circumferential surface 101e and the increased diameter inner circumferential surface 101f of the base section 101 and the increased diameter inner circumferential surface 101f side of the reduced diameter inner circumferential surface 102a of the inner circumferential lip section 102 are spaced apart from the cylindrical surface 75a. Then, the piston seal 45 comes in contact with the cylindrical surface 75a at only the boundary side between the reduced diameter inner circumferential surface 102a and the increased diameter inner circumferential surface 102b, and is deformed in a cylindrical surface shape having a diameter larger than before deformation conforming to the cylindrical surface 75a.

Figure 7B:
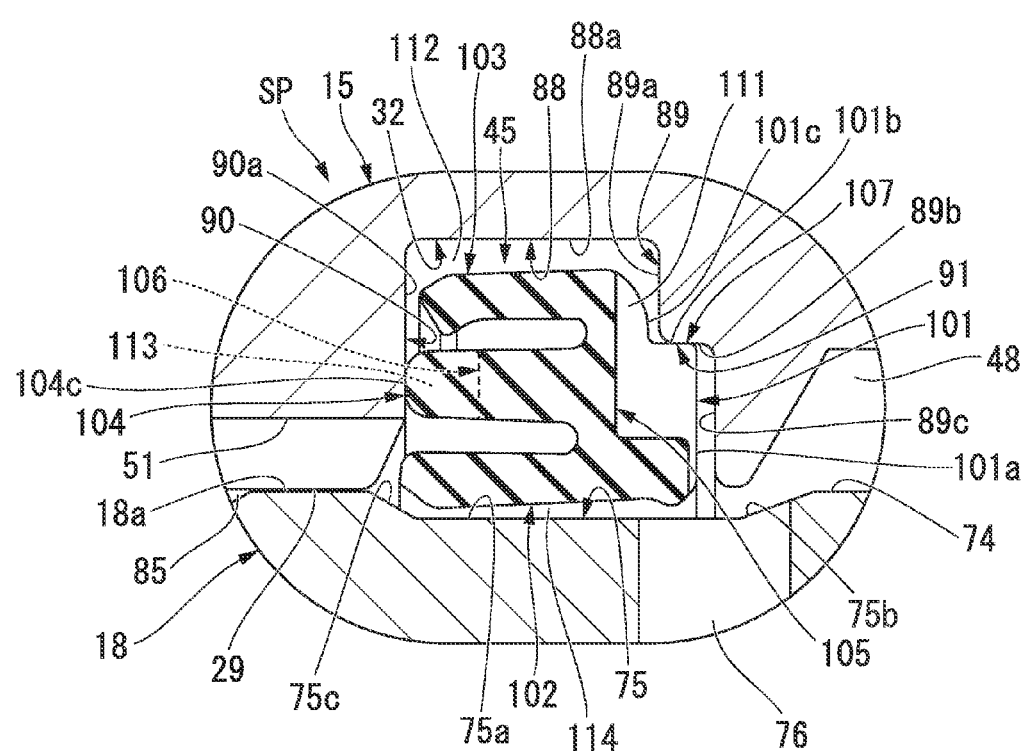
FIG. 7B is a partially enlarged cross-sectional view of the major part of the master cylinder of the second embodiment according to the present invention, showing a state in which a brake fluid is pumped and filled.

According to the second embodiment, as the interference of the piston seal 45 with the primary piston 18 is set to be a small value, upon the forced pumping shown in FIG. 7B, according to the pressure state between the primary pressure chamber 85 and the primary supply path 48 (specifically, when a pressure difference therebetween is larger than a predetermined value), in addition to deformation of the outer circumferential lip section 103 of the first embodiment, the inner circumferential lip section 102 is also bent in a direction approaching the intermediate protrusion section 104, and a flow path 114 between the inner circumferential lip section 102 and the primary piston 18 to bring the primary pressure chamber 85 and the primary supply path 48 in communication with each other. Accordingly, the brake fluid from the primary supply path 48 can flow to the primary pressure chamber 85 also from the flow path 114 between the inner circumferential lip section 102 and the primary piston 18, in addition to a flow constituted by the communication path 111 in the back side groove section 105, the flow path 112 between the outer circumferential lip section 103 and the groove bottom section 88, and the communication path 113 in the surface side groove section 106. Accordingly, the brake fluid can be filled in the primary pressure chamber 85 at a large flow rate. In addition, since the brake fluid can also flow from the flow path 114 between the inner circumferential lip section 102 and the primary piston 18, a flow rate of the flow path 112 between the outer circumferential lip section 103 and the groove bottom section 88 can be reduced, and excessive deformation of the outer circumferential lip section 103 can be suppressed.

In addition, since the interference of the piston seal 45 can be reduced, sliding resistance received from the piston seal 45 by the primary piston 18 can be reduced. Further, stiffness of the inner circumferential lip section 102 of the piston seal 45 can be reduced, and thus sliding resistance received from the piston seal 45 of the primary piston 18 can be further reduced.

Further, in the first and second embodiments, while the intermediate protrusion section 104 is formed at the piston seal 45, the embodiments are not limited thereto but only the inner circumferential lip section 102 and the outer circumferential lip section 103 may project from the base section 101 without the intermediate protrusion section 104 being formed.

[Third Embodiment]

Figure 8A:
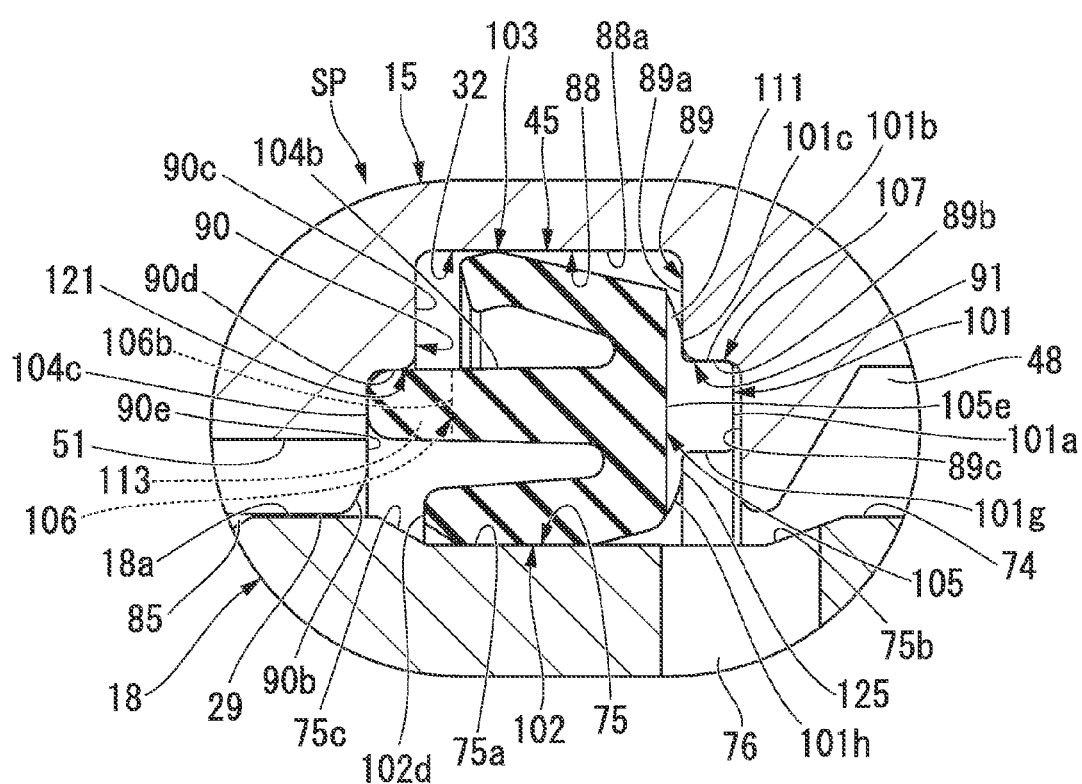
FIG. 8A is a partially enlarged cross-sectional view of a major part of a master cylinder of a third embodiment according to the present invention, showing a state in which a piston is at a basic position.

Next, a third embodiment according to the present invention will be described mainly based on FIGS. 8A and 8B focusing on differences from the second embodiment. Further, the same parts as the second embodiment are designated by the same names and the same reference numerals.

In the third embodiment, the circumferential wall 90 of the cylinder bottom side of the circumferential groove 32 is partially different from that of the second embodiment.

The circumferential wall 90 of the third embodiment has a large diameter wall surface 90c, an inner circumferential surface 90d, a small diameter wall surface 90e and the same tapered surface 90b as the first embodiment. The large diameter wall surface 90c is constituted by a flat surface parallel to the orthogonal plane of the cylinder axis at the groove bottom section 88 side in the radial direction of the circumferential wall 90. The large diameter wall surface 90c has a constant width in the cylinder radial direction with a constant inner diameter and a constant outer diameter, and forms an annular shape about the cylinder axis. The inner circumferential surface 90d extends closer to the cylinder bottom side (the left side of FIGS. 8A and 8B) than the large diameter wall surface 90c in the cylinder axial direction further inside in the cylinder radial direction than the large diameter wall surface 90c of the circumferential wall 90. The inner circumferential surface 90d is constituted by the cylindrical surface about the cylinder axis, and a length in the cylinder axial direction is constant.

The small diameter wall surface 90e is constituted by a flat surface parallel to the orthogonal plane of the cylinder axis further inside in the cylinder radial direction than the inner circumferential surface 90d of the circumferential wall 90. The small diameter wall surface 90e has a constant width in the cylinder radial direction with a constant inner diameter and a constant outer diameter except for the communication groove 51, and forms an annular shape about the cylinder axis. A round chamfer is formed at each of the boundary position between the large diameter side of the large diameter wall surface 90c and the cylinder bottom side of the groove bottom surface 88a, the boundary position between the small diameter side of the large diameter wall surface 90c and the cylinder opening side (the right side of FIG. 2) of the inner circumferential surface 90d, and the boundary position between the cylinder bottom side of the inner circumferential surface 90d and the large diameter side of the small diameter wall surface 90e. Then, the same tapered surface 90b as the first embodiment extends from an inner edge section of the small diameter wall surface 90e.

As described above, the circumferential wall 90 of the third embodiment has a step section (another step section) 121 disposed at an intermediate section in the radial direction such that the inside in the radial direction is disposed closer to the cylinder bottom side than the outside in the radial direction. The step section 121 has a part of the inner circumferential surface 90d side of the large diameter wall surface 90c, the inner circumferential surface 90d and a part of the inner circumferential surface 90d side of the small diameter wall surface 90e.

Then, the intermediate protrusion section 104 of the piston seal 45 of the third embodiment is longer in the axial direction than in the second embodiment, and abuts the inner circumferential surface 90d of the step section 121 in the reduced diameter outer circumferential surface 104b. That is, in the basic state shown in FIG. 8A, in the piston seal 45, the outer circumferential surface 101b of the step difference section 107 abuts the inner circumferential surface 89b of the step section 91 while the large diameter rear surface 101c of the step difference section 107 abuts the large diameter wall surface 89a of the step section 91 in the cylinder axial direction, and the reduced diameter outer circumferential surface 104b of the intermediate protrusion section 104 abuts the inner circumferential surface 90d of the step section 121 while the front end surface 104c of the intermediate protrusion section 104 abuts the small diameter wall surface 90e of the step section 121. As a result, in the piston seal 45, the intermediate protrusion section 104 is fitted to the other step section 121 formed at the circumferential groove 32 while the step difference section 107 formed at the base section 101 is fitted to the step section 91 formed at the circumferential groove 32. That is, both sides in the cylinder axial direction of the piston seal 45 of the third embodiment abut the circumferential wall 89 and the circumferential wall 90, and basically do not move in the cylinder axial direction.

As described above, even when the front end surface 104*c* of the intermediate protrusion section 104 abuts the small diameter wall surface 90*e* of the circumferential wall 90, the bottom surface 106*b* of the surface side groove section 106 formed at the intermediate protrusion section 104 is spaced apart from the circumferential wall 90 in the cylinder axial direction. That is, the communication path 113 in the surface side groove section 106 of the intermediate protrusion section 104 comes in constant communication with the primary pressure chamber 85 and the groove bottom section 88 side of the circumferential groove 32 even when the step section 121 is present.

In addition, since the piston seal 45 of the third embodiment decreases stiffness of the inner circumferential lip section 102, a cutout section 125 in which an outer circumferential side is longer in the axial direction than an inner circumferential side is formed at an inner circumferential side of the base section 101. The cutout section 125 has an inner circumferential surface 101*g* extending from the small diameter rear surface 101*a* toward the front side inside in the radial direction of the small diameter rear surface 101*a* of the base section 101, and a curved surface 101*h* extending from the front side of the inner circumferential surface 101*g* inward in the radial direction. The inner circumferential surface 101*g* has a constant diameter and a constant length in the axial direction, and is formed such that a part of the cylindrical surface is intermittently configured on the same cylindrical surface about the central axis of the piston seal 45. The curved surface 101*h* is inclined to be disposed closer to the front side as it goes inward in the radial direction. The curved surface 101*h* forms an arc shape in which a shape of a cross section including the central axis of the piston seal 45 has a center inside the base section 101. The curved surface 101*h* has a constant width in the cylinder radial direction with a constant inner diameter and a constant outer diameter, and is formed such that a part of the cylindrical surface is intermittently configured on the same cylindrical surface about the central axis of the piston seal 45. A round chamfer is formed at the boundary position between the small diameter rear surface 101*a* and the inner circumferential surface 101*g* and the boundary position between the inner circumferential surface 101*g* and the curved surface 101*h*. In addition, in the third embodiment, the back side groove section 105 has a bottom surface 105*e* in a direction perpendicular to the axis, and passes through the base section 101 in the radial direction.

According to the third embodiment, since the reduced diameter outer circumferential surface 104*b* of the intermediate protrusion section 104 abuts the step section 121 of the circumferential wall 90 of the cylinder bottom side of the circumferential groove 32, the posture of the piston seal 45 can be further stabilized.

Figure 8B:
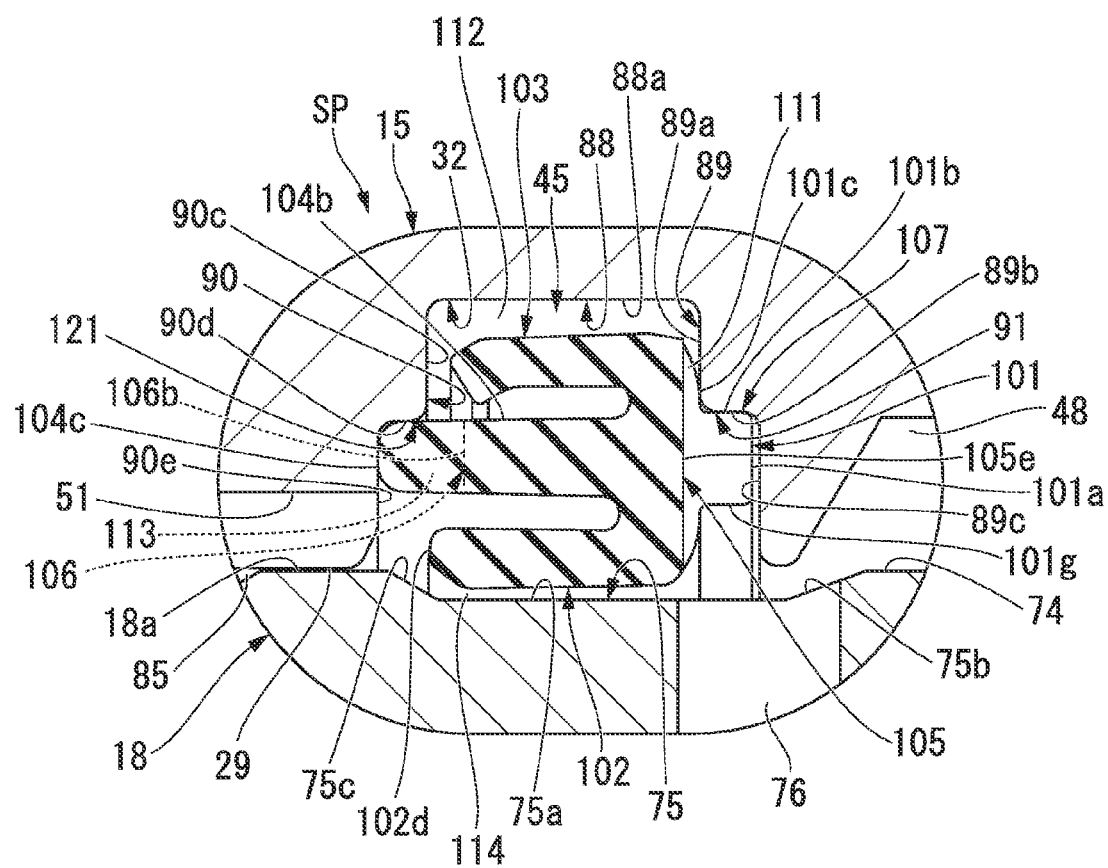
FIG. 8B is a partially enlarged cross-sectional view of the major part of the master cylinder of the third embodiment according to the present invention, showing a state in which a brake fluid is pumped and filled.

Even in the third embodiment, like the second embodiment, as the interference of the piston seal 45 with the primary piston 18 is set to a small value, upon the forced pumping or the like shown in FIG. 8B, in response to the pressure state between the primary pressure chamber 85 and the primary supply path 48, the inner circumferential lip section 102 is also bent in a direction approaching the intermediate protrusion section 104 in addition to the outer circumferential lip section 103, and the flow path 114 is formed between the piston seal 45 and the primary piston 18 to bring the primary pressure chamber 85 and the primary supply path 48 in communication with each other. Here, in the piston seal 45, since the end section of the intermediate protrusion section 104 opposite to the base section 101 abuts the step section 121 of the circumferential groove 32 in the cylinder radial direction while the step difference section 107 of the base section 101 abuts the step section 91 of the circumferential groove 32 in the cylinder radial direction, the inner circumferential lip section 102 can be suppressed from being excessively bent outward in the radial direction. Accordingly, the brake fluid from the primary supply path 48 can appropriately flow into the primary pressure chamber 85 through the communication path 111 in the back side groove section 105, the flow path 112 between the outer circumferential lip section 103 and the groove bottom section 88, a flow constituted by the communication path 113 in the surface side groove section 106, and the flow path 114 between the inner circumferential lip section 102 and the primary piston 18.

Further, in the above-mentioned embodiment, while the seal structure section SP of the primary side has been exemplarily described, since the seal structure section SS of the secondary side has the same structure, the same effects can be exhibited and the same modifications become possible.

In the above-mentioned embodiment, there is provided a master cylinder including a cylinder main body having a bottomed cylindrical shape including an ejection path of a brake fluid and a supply path in communication with a reservoir, a piston movably disposed in the cylinder main body and configured to form a pressure chamber formed between the piston and the cylinder main body and configured to supply a fluid pressure to the ejection path, and a piston seal installed in a circumferential groove formed in the cylinder main body such that an inner circumference thereof comes in sliding contact with the piston to seal between the supply path and the pressure chamber. The piston seal includes an annular base section, an inner circumferential lip section protruding from an inner circumferential side of the base section to come in sliding contact with an outer circumferential surface of the piston, an outer circumferential lip section protruding from an outer circumferential side of the base section to abut the circumferential groove of the cylinder main body, and an intermediate protrusion section protruding from between the inner circumferential lip section and the outer circumferential lip section of the base section to a forward side of the outer circumferential lip section. A step difference section that is long in the axial direction at the inner circumferential side is formed at the outer circumferential side of the base section. A step section in which the outer circumferential surface of the step difference section always abuts is formed at a circumferential wall of an opening section side of the cylinder main body of the circumferential groove. A communication path configured to bring the supply path in communication with a bottom section side of the circumferential groove is installed between the step difference section and the step section. Accordingly, as the outer circumferential surface of the step difference section abuts the step section, overturning of the base section can be suppressed, and thus a posture of the piston seal can be stabilized.

In addition, another step section in which the outer circumferential surface of the intermediate protrusion section abuts is formed at the circumferential wall of the bottom section side of the cylinder main body of the circumferential groove, and a plurality of communication sections formed to be spaced apart from each other in the circumferential direction and configured to bring the bottom section side of the circumferential groove in communication with the pressure chamber are formed at a front end side of the intermediate protrusion section. Since the outer circumferential surface of the intermediate protrusion section abuts the other step section of the circumferential groove, a posture of the piston seal can be further stabilized.

In addition, since the inner circumferential lip section is bent in a direction approaching the intermediate protrusion section in response to the pressure state between the pressure chamber and the supply path to bring the supply path and the pressure chamber in communication with each other, the brake fluid of the supply path can flow into the pressure chamber also from the flow path between the inner circumferential lip section and the piston.

INDUSTRIAL APPLICABILITY

According to the above-mentioned master cylinder, a posture of the piston seal can be stabilized.

REFERENCE SIGNS LIST 11 master cylinder
12 reservoir
13 bottom section
15 cylinder main body
16 opening section
18 primary piston (piston)
18a outer circumferential surface
19 secondary piston (piston)
26 secondary ejection path (ejection path)
27 primary ejection path (ejection path)
30, 32 circumferential groove
35, 45 piston seal
38 secondary supply path (supply path)
48 primary supply path (supply path)
68 secondary pressure chamber (pressure chamber)
85 primary pressure chamber (pressure chamber)
88 groove bottom section (bottom section of circumferential groove)
89 circumferential wall (circumferential wall of opening section side of cylinder main body)
90 circumferential wall (circumferential wall of bottom section side of cylinder main body)
91 step section
101 base section
101b outer circumferential surface
102 inner circumferential lip section
103 outer circumferential lip section
104 intermediate protrusion section
106 surface side groove section (communication section)
107 step difference section
111 communication path
121 step section (other step section)

The invention claimed is:
1. A master cylinder comprising:
a cylinder main body having a bottomed cylindrical shape including an ejection path of a brake fluid and a supply path in communication with a reservoir;
a piston movably disposed in the cylinder main body and configured to form a pressure chamber formed to supply a fluid pressure to the ejection path between the piston and the cylinder main body; and
a piston seal installed in a circumferential groove formed in the cylinder main body such that an inner circumference thereof comes in sliding contact with the piston to seal between the supply path and the pressure chamber,
wherein the piston seal comprises:
an annular base section,
an inner circumferential lip section projecting from the annular base section and being in slidable contact with an outer circumferential surface of the piston,
an outer circumferential lip section projecting from the annular base section and abutting the circumferential groove of the cylinder main body,
wherein a step difference section that is long in a cylinder axial direction at an inner circumferential side of the annular base section is formed at an outer circumferential side of the annular base section,
wherein the circumferential groove has a step section at a circumferential wall of an opening section side of the cylinder main body, wherein the step section has a large diameter wall surface that is provided at a side closer to a groove bottom section in a cylinder radial direction and is configured of a surface parallel to a plane orthogonal to a cylinder axis, an inner circumferential wall surface that is provided inside of the large diameter wall surface in the cylinder radial direction and extends in the cylinder axial direction closer to the opening section side of the cylinder main body than the large diameter wall surface, and a small diameter wall surface that is provided inside of the inner circumferential wall surface in the cylinder radial direction and is configured of a surface parallel to a plane orthogonal to the cylinder axis, and
wherein a length of an overlapping region in the cylinder axial direction between an outer circumferential surface of the step difference section of the annular base section and the inner circumferential wall surface of the step section of the circumferential wall is larger than a movable distance of the piston seal in the cylinder axial direction in the circumferential groove of the cylinder main body.

2. The master cylinder according to claim 1, wherein the piston seal further comprises an intermediate protrusion section projecting from between the inner circumferential lip section and the outer circumferential lip section of the annular base section to a forward side of the outer circumferential lip section, and
the inner circumferential lip section is bent in a direction approaching the intermediate protrusion section in response to a pressure state between the pressure chamber and the supply path to bring the supply path and the pressure chamber in communication with each other.

3. The master cylinder according to claim 1, wherein the piston seal is configured such that the inner circumferential wall surface of the annular base section becomes spaced apart from the outer circumferential surface of the piston at a time of a basic state serving as a non-braking state before a brake pedal configured to move the piston is manipulated.

4. The master cylinder according to claim 1, wherein the piston seal further comprises an intermediate protrusion section projecting from between the inner circumferential lip section and the outer circumferential lip section of the annular base section to a forward side of the outer circumferential lip section,
wherein another step section in which an outer circumferential surface of the intermediate protrusion section abuts is formed at the circumferential wall of a bottom section side of the circumferential groove of the cylinder main body, and wherein a plurality of communication sections configured to bring the bottom section side of the circumferential groove in communication with the pressure chamber are formed at a front end side of the intermediate protrusion section to be spaced apart from each other in the circumferential direction.

5. The master cylinder according to claim 1, wherein a cutout section that is longer in the cylinder axial direction at the outer circumferential side than at an inner circumferential side is formed at the inner circumferential side surface of the annular base section.

6. A master cylinder comprising:
a cylinder main body having a bottomed cylindrical shape including an ejection path of a brake fluid and a supply path in communication with a reservoir, the cylinder main body into which a piston is movably disposed; and
a piston seal installed in a circumferential groove formed in the cylinder main body such that an inner circumference thereof comes in sliding contact with the piston,
wherein the piston seal comprises:
an annular base section,
an inner circumferential lip section projecting from the annular base section and being in slidable contact with an outer circumferential surface of the piston,
an outer circumferential lip section projecting from the annular base section and abutting the circumferential groove of the cylinder main body,
an intermediate protrusion section projecting from between the inner circumferential lip section and the outer circumferential lip section of the annular base section to a forward side of the outer circumferential lip section, and
a step difference section that is long in a cylinder axial direction at an inner circumferential side of the annular base section is formed at an outer circumferential side of the annular base section,
wherein the circumferential groove has a step section at a circumferential wall of an opening section side of the cylinder main body, wherein the step section has a large diameter wall surface that is provided at a side closer to a groove bottom section in a cylinder radial direction and is configured of a surface parallel to a plane orthogonal to a cylinder axis, an inner circumferential wall surface that is provided inside of the large diameter wall surface in the cylinder radial direction and in the cylinder axial direction closer to the opening section side of the cylinder main body than the large diameter wall surface, and a small diameter wall surface that is provided inside of the inner circumferential wall surface in the cylinder radial direction and is configured of a surface parallel to a plane orthogonal to the cylinder axis, and
wherein a length of an overlapping region in the cylinder axial direction between an outer circumferential surface of the step difference section of the annular base section and the inner circumferential wall surface of the step section of the circumferential wall is larger than a movable distance of the piston seal in the cylinder axial direction in the circumferential groove of the cylinder main body.

7. The master cylinder according to claim 6, wherein a pressure chamber is formed between the cylinder main body, the piston seal, and the piston, and
the inner circumferential lip section is bent in a direction approaching the intermediate protrusion section in response to a pressure state between the pressure chamber and the supply path to bring the supply path and the pressure chamber in communication with each other.

8. The master cylinder according to claim 6, wherein the piston seal is formed such that the inner circumferential wall surface of the annular base section becomes spaced apart from the outer circumferential surface of the piston at a time of a basic state serving as a non-braking state before a brake pedal configured to move the piston is manipulated.

9. The master cylinder according to claim 6, wherein
another step section in which an outer circumferential surface intermediate protrusion section abuts is formed at the circumferential wall of a bottom section side of the circumferential groove of the cylinder main body and
a plurality of communication sections configured to bring the bottom section side of the circumferential groove in communication with the pressure chamber are formed at a front end side of the intermediate protrusion section to be spaced apart from each other in the circumferential direction.

10. The master cylinder according to claim 6, wherein a cutout section that is longer in the cylinder axial direction at the outer circumferential side than at an inner circumferential side is formed at the inner circumferential side surface of the annular base section.

11. A master cylinder comprising:
a cylinder main body having a bottomed cylindrical shape including a supply path in communication with a reservoir, the cylinder main body into which a piston is movably disposed and into which a piston seal having an inner circumferential surface slidably contacts an outer circumferential surface of the piston is disposed, wherein a pressure chamber is configured to be formed inside the cylinder main body,
wherein the piston seal is installed in a circumferential groove formed in the cylinder main body,
wherein the piston seal comprises:
an annular base section;
an inner circumferential lip section projecting from the annular base section and being in slidable contact with the outer circumferential surface of the piston;
an outer circumferential lip section projecting from the annular base section and abutting the circumferential groove of the cylinder main body; and
an intermediate protrusion section projecting from between the inner circumferential lip section and the outer circumferential lip section of the annular base section to a forward side of the outer circumferential lip section, and
a step difference section that is long in a cylinder axial direction at an inner circumferential side of the annular base section is formed at an outer circumferential side of the annular base section,
wherein the circumferential groove has a step section at a circumferential wall of an opening section side of the cylinder main body, wherein the step section has a large diameter wall surface that is provided at a side closer to a groove bottom section in a cylinder radial direction and is configured of a surface parallel to a plane orthogonal to a cylinder axis, an inner circumferential wall surface that is provided inside of the large diameter wall surface in the cylinder radial direction and extends in the cylinder axial direction closer to the opening section side of the cylinder main body than the large diameter wall surface, and a small diameter wall surface that is provided inside of the inner circumferential wall surface in the cylinder radial direction and is configured of a surface parallel to a plane orthogonal to the cylinder axis, wherein a length of an overlapping region in the cylinder axial direction between an outer circumferential surface of the step difference section of the annular base section and the inner circumferential wall surface of the step section of the circumferential wall is larger than a movable distance of the piston seal in the cylinder axial direction in the circumferential groove of the cylinder main body, and wherein the inner circumferential lip section is bent in a direction approaching the intermediate protrusion section in response to the pressure state between the pressure chamber and the supply path to bring the supply path and the pressure chamber in communication with each other.

12. The master cylinder according to claim 11, wherein a communication path configured to bring the supply path in communication with the groove bottom section of the circumferential groove is formed between the step difference section and the step section.

13. The master cylinder according to claim 11, wherein the piston seal is formed such that the inner circumferential wall surface of the annular base section becomes spaced apart from the outer circumferential surface of the piston at a time of a basic state serving as a non-braking state before a brake pedal configured to move the piston is manipulated.

14. The master cylinder according to claim 11, wherein another step section in which an outer circumferential surface of the intermediate protrusion section abuts is formed at the circumferential wall of a bottom section side of the cylinder main body of the circumferential groove, and a plurality of communication sections configured to bring the bottom section side of the circumferential groove in communication with the pressure chamber are formed at a front end side of the intermediate protrusion section to be spaced apart from each other in the circumferential direction.

15. The master cylinder according to claim 11, wherein a cutout section that is longer in the cylinder axial direction at the outer circumferential side than at the inner circumferential side is formed at an inner circumferential side surface of the annular base section.

* * * * *